US012729801B2

(12) United States Patent
Ergun et al.

(10) Patent No.: US 12,729,801 B2
(45) Date of Patent: Sep. 8, 2026

(54) ADJUSTABLE LIFT SYSTEM

(71) Applicant: Ergotron, Inc., St. Paul, MN (US)

(72) Inventors: Mustafa A. Ergun, Eden Prairie, MN (US); Nicholas Robert Swartz, Minneapolis, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 19/124,200

(22) PCT Filed: Dec. 18, 2023

(86) PCT No.: PCT/US2023/084663
§ 371 (c)(1),
(2) Date: Apr. 24, 2025

(87) PCT Pub. No.: WO2024/137524
PCT Pub. Date: Jun. 27, 2024

(65) Prior Publication Data

US 2026/0007228 A1 Jan. 8, 2026

Related U.S. Application Data

(60) Provisional application No. 63/476,087, filed on Dec. 19, 2022.

(51) Int. Cl.
*F16M 11/04* (2006.01)
*A47B 9/02* (2006.01)
(Continued)

(52) U.S. Cl.
CPC ............. *F16M 11/046* (2013.01); *A47B 9/02* (2013.01); *A47B 9/12* (2013.01); *A47B 9/20* (2013.01);
(Continued)

(58) Field of Classification Search
CPC .. F16M 11/046; F16M 2200/047; A47B 9/02; A47B 9/12; A47B 9/20; A47B 21/02; A47B 2200/0051; A47B 2200/0076
(Continued)

(56) References Cited

U.S. PATENT DOCUMENTS 2,919,168 A * 12/1959 Shivek ..................... B65G 1/07 254/47
3,370,556 A * 2/1968 Kooi ...................... A47B 27/14 108/2
(Continued)

FOREIGN PATENT DOCUMENTS

| | | | |
|---|---|---|---|
| DE | 102018125663 | A1 | 4/2020 |
| WO | WO-2024137524 | A2 | 6/2024 |
| WO | WO-2024137524 | A3 | 8/2024 |

OTHER PUBLICATIONS

"International Application Serial No. PCT/US2023/084663, International Search Report mailed May 21, 2024", 4 pgs.
(Continued)

*Primary Examiner* — Daniel J Troy
*Assistant Examiner* — Timothy M Ayres
(74) *Attorney, Agent, or Firm* — Schwegman Lundberg & Woessner, P.A.

(57) ABSTRACT

A lift system is designed for raising and lowering a load. The lift system can include a movable portion in sliding engagement with a fixed portion. The lift system can be configured to translate the load coupled to the movable portion relative to the fixed portion. The lift system can also include a counterbalance mechanism having an arm rotatably coupled to the fixed portion, and one or more springs coupled to the arm and the fixed portion. The arm can be operably coupled to the movable portion through a cord. As the movable portion translates, the arm can rotate to deflect the one or
(Continued)

more springs to provide a lift force to offset the weight of the load.

3 Claims, 16 Drawing Sheets

(51) Int. Cl.
*A47B 9/12* (2006.01)
*A47B 9/20* (2006.01)
*A47B 21/02* (2006.01)

(52) U.S. Cl.
CPC ...... *A47B 21/02* (2013.01); *A47B 2200/0051* (2013.01); *A47B 2200/0076* (2013.01); *F16M 2200/047* (2013.01)

(58) Field of Classification Search
USPC ............................ 108/147; 312/319.1–319.4
See application file for complete search history.

(56) References Cited

U.S. PATENT DOCUMENTS 3,722,970 A * 3/1973 Healy ...................... B65G 1/07 211/59.3
3,807,821 A * 4/1974 Olsson ..................... B65G 1/07 211/59.3
3,820,478 A * 6/1974 Bergenthal ............. A47B 51/00 108/136
3,941,440 A * 3/1976 Menzin .................... B65G 1/07 221/232
4,981,085 A 1/1991 Watt
5,311,827 A * 5/1994 Greene .................. F16M 11/18 74/89.22
5,682,825 A 11/1997 Manner
5,797,331 A 8/1998 Watt
6,189,849 B1 2/2001 Sweere et al.
6,443,075 B1 * 9/2002 Hahn ....................... A47B 9/02 108/147
7,743,716 B1 6/2010 Burka
8,181,927 B2 * 5/2012 Farrow .................. F16M 13/02 248/292.13
8,641,007 B2 * 2/2014 Chen ...................... F16M 11/28 248/458
8,899,540 B2 * 12/2014 Honsberger .......... E05F 1/1075 248/281.11
10,542,817 B2 * 1/2020 Swartz ..................... A47B 9/02
2011/0266937 A1 11/2011 Roberts et al.

OTHER PUBLICATIONS

"International Application Serial No. PCT/US2023/084663, Invitation to Pay Additional Fees Mar. 8, 2024", 2 pgs.
"International Application Serial No. PCT/US2023/084663, Written Opinion mailed May 21, 2024", 5 pgs.

* cited by examiner

ADJUSTABLE LIFT SYSTEM

CLAIM OF PRIORITY

This patent application claims the benefit of priority of Ergun, et al. U.S. Provisional Patent Application Ser. No. 63/476,087, entitled "ADJUSTABLE LIFT SYSTEM," filed on Dec. 19, 2022, which is hereby incorporated by reference herein in its entirety.

TECHNICAL FIELD

This document pertains generally, but not by way of limitation, to a lift system for lifting and balancing a load.

BACKGROUND

Electronic displays, such as, for example, computer monitors, tablets, televisions, and the like, and workstations, such as, for example, desks, carts, wall mounts, and the like, are used in a variety of settings. In some settings, one electronic display may be used by multiple operators. In another example, a television may be deployed in a conference center where many individuals use the electronic display throughout the day. In yet another example, a workstation may be deployed in a workplace that is shared by multiple employees. A flexible and adjustable workstation can improve its usage in a shared workspace.

BRIEF DESCRIPTION OF THE DRAWINGS

The following drawings are illustrative of particular embodiments of the present invention and therefore do not limit the scope of the invention. The drawings are not to scale and are intended for use in conjunction with the explanations in the following detailed description. Like numerals may describe similar components in different views. Like numerals having different letter suffixes may represent different instances of similar components. The drawings illustrate generally, by way of example, but not by way of limitation, various embodiments discussed in the present document.

OVERVIEW

This disclosure is directed to devices that can position a load (e.g., an electronic display, a work surface, a platform, or the like) along a range of travel. In some cases, positioning can include lifting and/or translating the load in a vertical direction. Positioning the load may also involve countering a weight of the load and a weight of at least a portion of the positioning apparatus to assist a user in moving the load.

In some configurations, the positioning apparatus can include a lift mechanism for raising and lowering the load. The lift mechanism can generally include a fixed portion configured to be coupled to a structure and a movable portion configured to be coupled to the load. A sliding mechanism can be coupled to the fixed portion and the movable portion, and it can provide the movable portion with a range of travel relative to the fixed portion. The range of travel can include a high position and a low position, which in some cases can be the same as a minimum height and a maximum height. In the high position, the movable portion can be proximate an upper end of the fixed portion, and in the low position, the movable portion can be proximate a lower end of the fixed portion.

In some example configurations, the lift mechanism can include a counterbalance mechanism. The counterbalance mechanism can be mounted on either one of the fixed portion or the movable portion, and it can be coupled to the fixed portion and the movable portion. The counterbalance mechanism can be configured to generate a lift force for countering the combined weight of the load coupled to the movable portion (e.g., the weight of the electronic display, the weight of the work surface, or the like) and the weight of the movable portion. In some example configurations (e.g., when the counterbalance mechanism is mounted on the movable portion), the lift force can counter a weight of the counterbalance mechanism as well.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
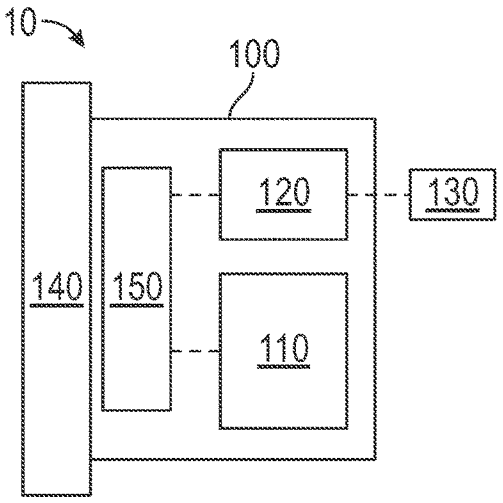
FIG. 1 is a block diagram representation of a positioning apparatus according to an example configuration of the current disclosure.

FIG. 1 is a block diagram representation of a positioning apparatus 10 according to an example configuration of the current disclosure. The positioning apparatus 10 can be one of a mobile workstation 160 (shown in FIG. 2), a wall mounted workstation 170 (shown in FIG. 3), a freestanding workstation 180 (shown in FIG. 4), a wall mount assembly 190 (shown in FIG. 5), or the like. The positioning apparatus 10 can include a lift mechanism 100 coupled to a structure 140 including, but not limited to a wall, a wheeled base, cabinet, or the like.

The lift mechanism 100 can include a fixed portion 110 and a movable portion 120. The fixed portion 110 can be stationary relative to the structure 140. The movable portion 120 can be movably (e.g., slidably, or the like) coupled to the fixed portion 110. In some example configurations, one or more loads 130 (e.g., an electronic display, a work surface, a platform, or the like) can be coupled to the movable portion 120. The lift mechanism 100 can be configured to raise and lower the one or more loads 130 relative to the structure 140.

The lift mechanism 100 can also include a counterbalance mechanism 150 coupled between the fixed portion 110 and the movable portion 120. The counterbalance mechanism 150 can be adapted to counter a portion of the combined weight of the one or more loads 130 and the weight of the movable portion 120.

FIGS. 2-5 illustrate various applications of a positioning apparatus 10 according to some example configurations of the current disclosure. Each of the example configurations shown in FIGS. 2-5 includes various components of the positioning apparatus 10 described in previous sections in relation to FIG. 1.

Figure 2:
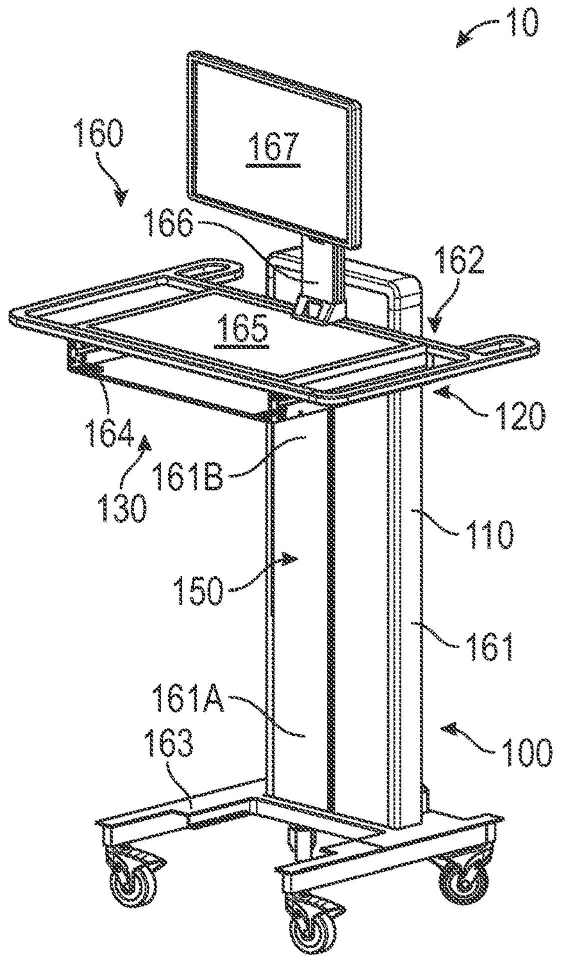
FIG. 2 is an isometric view of a mobile workstation according to an example configuration of the current disclosure.

FIG. 2 is an isometric view of a mobile workstation 160 according to an example configuration of the current disclosure. The mobile workstation 160 can include a lift mechanism 100 having a fixed portion 110 (e.g., a support column 161) and a movable portion 120 (e.g., a movable bracket 162). The movable bracket 162 can be slidably engaged with the support column 161. The support column 161 can extend from a first portion 161A to a second portion 161B generally in a vertical direction. The support column 161 can be coupled to a structure 140 (e.g., a wheeled base 163) proximate the first portion 161A and the movable bracket 162 can be located proximate the second portion 161B of the support column 161. One or more loads 130 (e.g., a platform 164, or the like) can be coupled to the movable bracket 162. The platform 164 can include a work surface 165, a display mount 166, a keyboard tray, and other components. The display mount 166 can hold an electronic display 167 above the work surface 165. The lift mechanism 100 can be used for raising and lowering the platform 164 and other components coupled to the platform 164).

The lift mechanism 100 of the mobile workstation 160 of FIG. 2 can also include a counterbalance mechanism 150. The counterbalance mechanism 150 can be located inside the support column 161. The counterbalance mechanism 150 can be coupled between the support column 161 and the movable bracket 162. The counterbalance mechanism 150 can generate a lift force for countering a combined weight of the one or more loads 130 (e.g., weight of the platform 164, the display mount 166, the electronic display 167, or the like) and the weight of a portion of the lift mechanism 100 (e.g., weight of the movable bracket 162, or the like).

Figure 3:
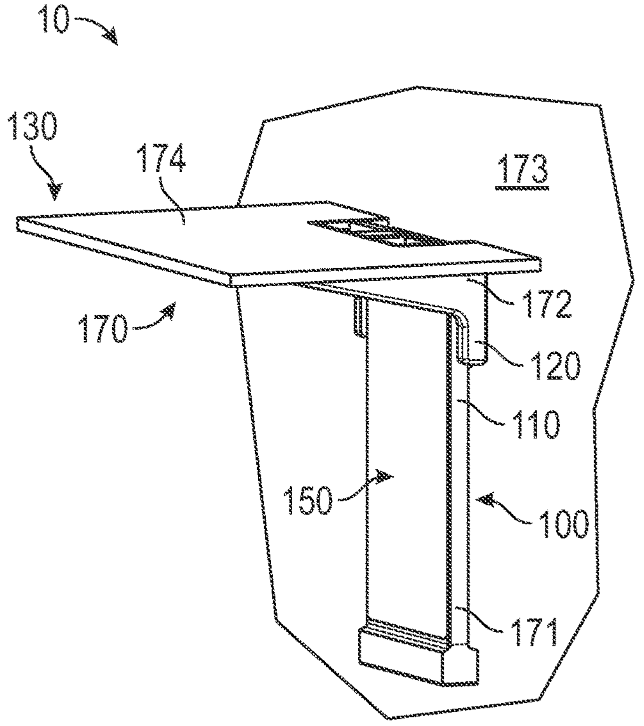
FIG. 3 is an isometric view of a wall mounted workstation according to an example configuration of the current disclosure.

FIG. 3 is an isometric view of a wall mounted workstation 170 according to an example configuration of the current disclosure. The wall mounted workstation 170 can include a lift mechanism 100 having a fixed portion 110 (e.g., support column 171) and a movable portion 120 (e.g., movable bracket 172). The movable bracket 172 can be slidably engaged with the support column 171. The support column can be coupled to a structure 140 (e.g., a wall 173). One or more loads 130 (e.g., a work surface 174, or the like) can be coupled to the movable bracket 172. In some example configurations, the one or more loads 130 can include one or more other components (e.g., an electronic display, a keyboard, a printer, or the like) coupled to the work surface 174. The lift mechanism 100 can be configured for raising and lowering the one or more loads 130.

The lift mechanism 100 of the wall mounted workstation 170 of FIG. 3 can also include a counterbalance mechanism 150. The counterbalance mechanism 150 can be located inside the support column 171. The counterbalance mechanism 150 can be coupled between the support column 171 and the movable bracket 172. The counterbalance mechanism 150 can generate a lift force for countering a combined weight of the one or more loads 130 (e.g., weight of the work surface 174 and other components coupled to the work surface 174) and the weight of a portion of the lift mechanism 100 (e.g., weight of the movable bracket 172, or the like).

Figure 4:
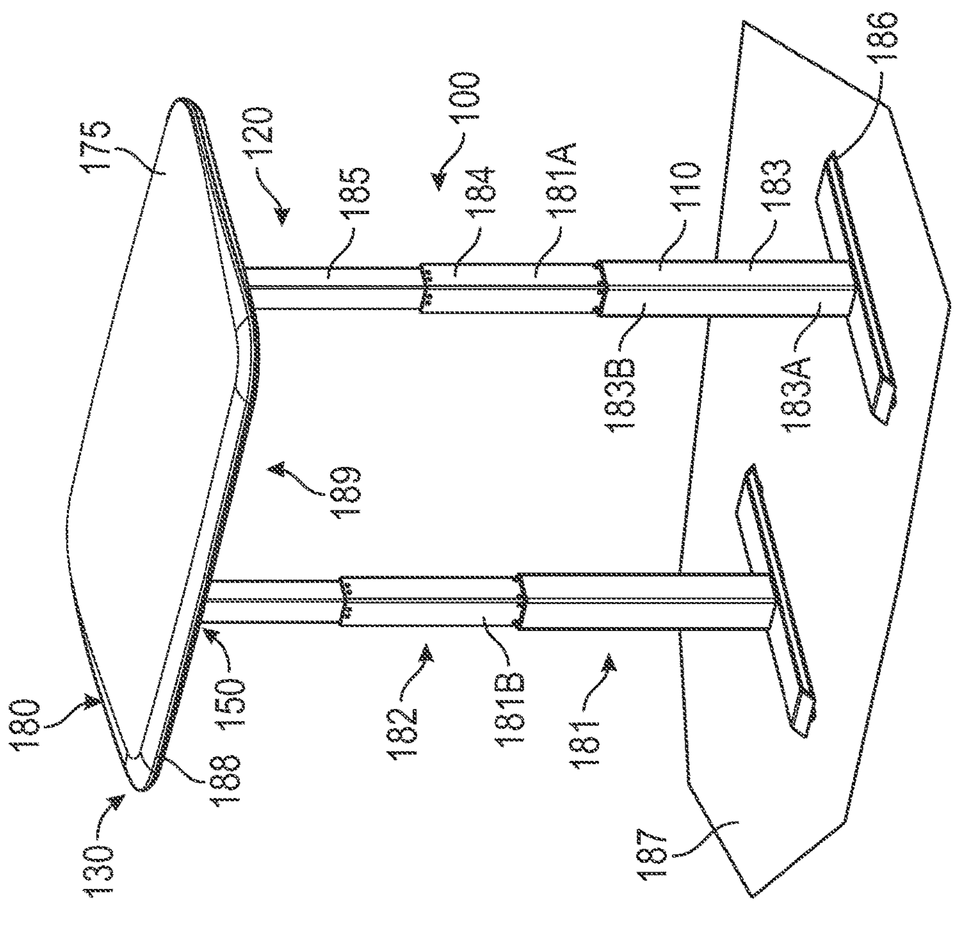
FIG. 4 is an isometric view of a freestanding workstation (e.g., a table or the like) according to an example configuration of the current disclosure.

FIG. 4 is an isometric view of a freestanding workstation 180 (e.g., a table, or the like) according to an example configuration of the current disclosure. The freestanding workstation 180 can have a lift mechanism 100 including one or more leg assemblies 181 (e.g., a first leg assembly 181A and a second leg assembly 181B) supporting one or more loads 130 (e.g., a work surface 175 and one or more other components coupled to the work surface 175). The one or more leg assemblies 181 can include a fixed portion 110 (e.g., a first member 183) and a movable portion 120 (e.g., a second member 184 and a third member 185). The first member 183 can extend from a first portion 183A to a second portion 183B generally in a vertical direction. The first member 183 can be coupled to a foot 186 proximate the first portion 183A and movably (e.g., telescopically) engaged with the second member 184 and the third member 185 proximate the second portion 183B. The foot 186 can be placed over a structure 140 (e.g., a floor 187). The second member 184 or the third member 185 of the one or more leg assemblies 181 can be coupled to an underside 188 of the work surface 175, as illustrated in FIG. 4. In some example configurations, a frame 189 can be coupled to the underside 188 of the work surface 175. The frame 189 can be adapted to receive the second member 184 or the third member 185 of the one or more leg assemblies 181 to couple the one or more leg assemblies 181 to the work surface 175.

In some example configurations, the one or more leg assemblies 181 can be height adjustable. The one or more leg assemblies 181 can include one or more telescoping members (e.g., the second member 184 and the third member 185). The one or more telescoping members can be adapted to move relative to the first member 183 to adjust a height of the one or more leg assemblies 181. The one or more leg assemblies 181 can also include a height adjustment mechanism 182.

Figure 22:
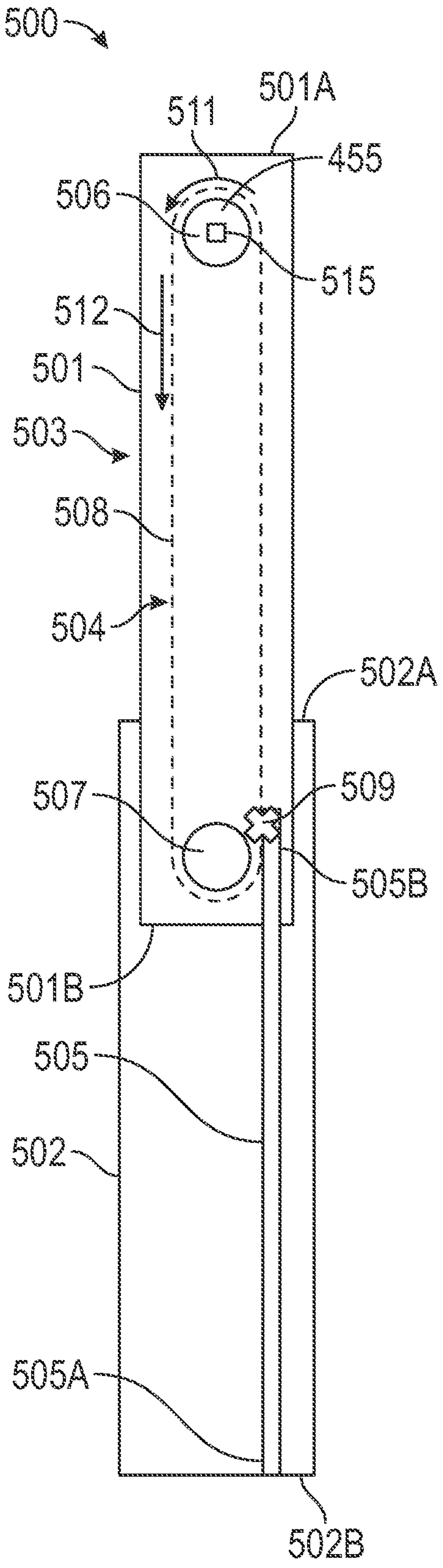
FIG. 22 is a schematic view of a leg assembly according to an example configuration of the current disclosure.
Figure 23:
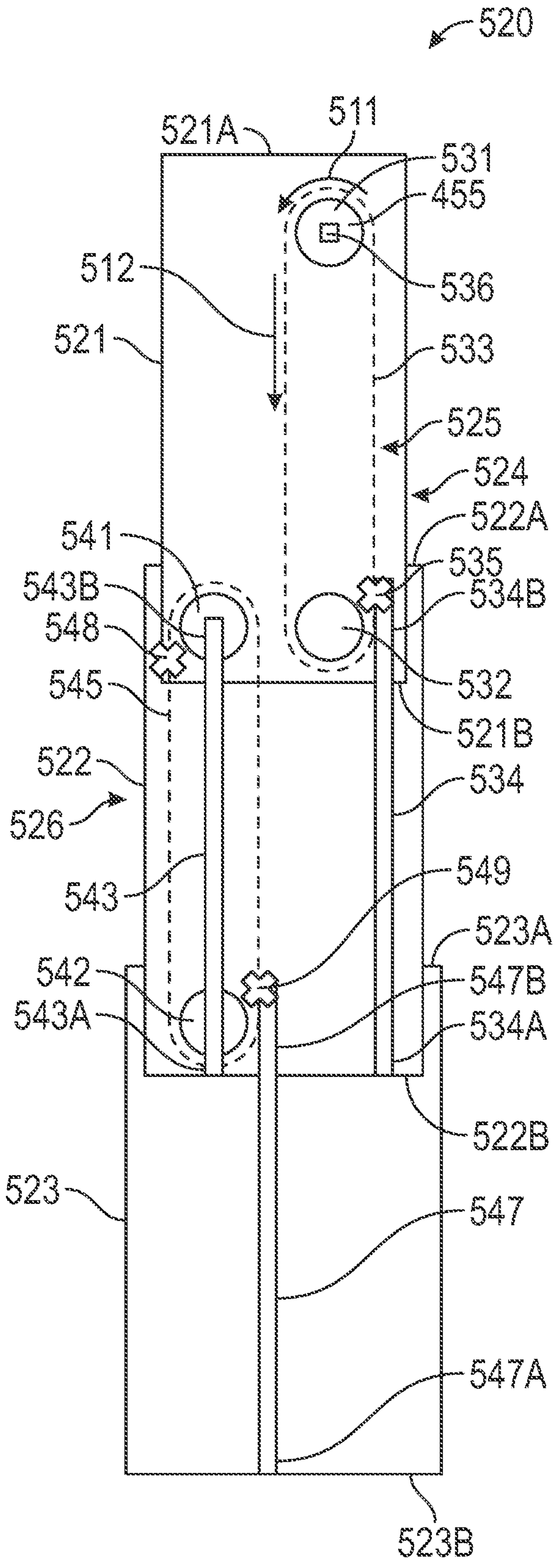
FIG. 23 is a schematic view of a leg assembly according to another example configuration of the current disclosure.

The height adjustment mechanism 182 can be contained inside the one or more leg assemblies 181 (e.g., the height adjustment mechanisms 503 or 524 of FIGS. 22-23). The height adjustment mechanism 182 can be coupled to the first member 183, the second member 184, and the third member 185 of the one or more leg assemblies 181. The height adjustment mechanism 182 can be configured to adjust a height of the one or more leg assemblies 181. In some example configurations, the height adjustment mechanism 182 can include a synchronizing bar (e.g., the synchronizing bar 430 of FIG. 17) to synchronize a movement of the first leg assembly 181A with a movement of the second leg assembly 181B.

The lift mechanism 100 of the freestanding workstation 180 of FIG. 4 can also include a counterbalance mechanism 150. In some example configurations, the counterbalance mechanism 150 can be coupled to the underside 188 of the work surface 175 (e.g., coupled to the frame 189). The counterbalance mechanism 150 can be operably coupled to the height adjustment mechanism 182. The counterbalance mechanism 150 can generate a lift force for countering a combined weight of the one or more loads 130 (e.g., the weight of the work surface 175 and other components coupled to the work surface 175 such as the frame 189 and the counterbalance mechanism 150, or the like) and the weight of a portion of the lift mechanism 100 (e.g., weight of the second member 184 and the third member 185, or the like).

Figure 5:
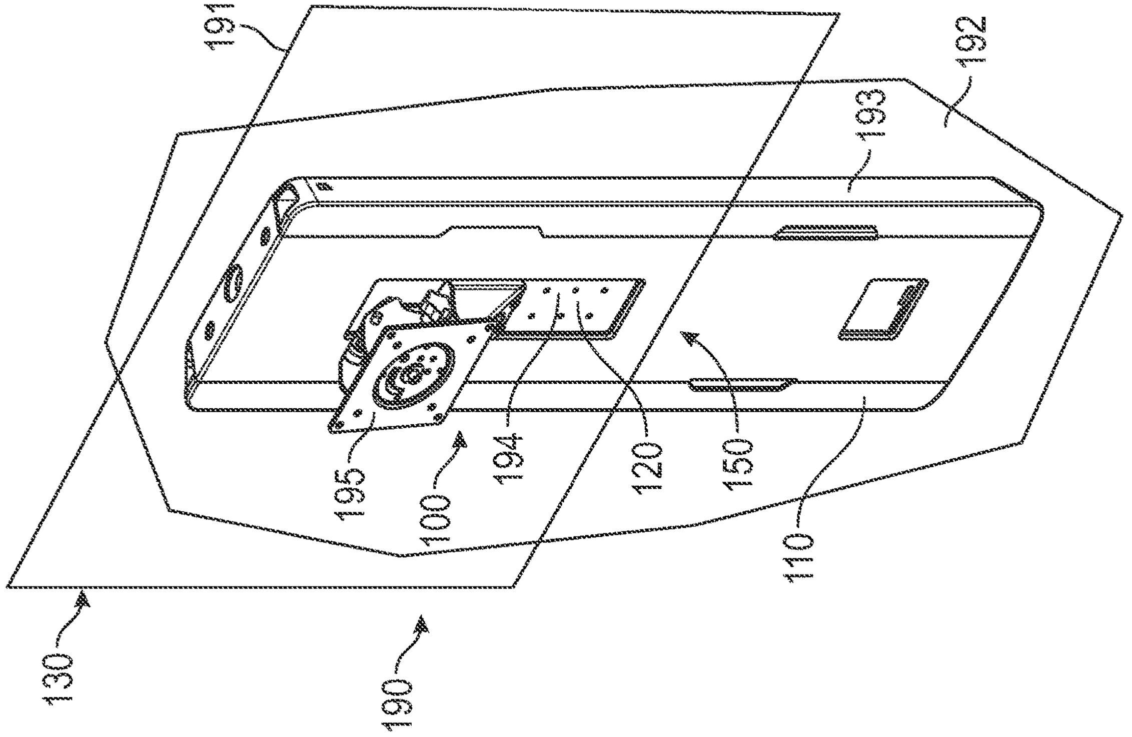
FIG. 5 is an isometric view of a wall mount for an electronic display according to an example configuration of the current disclosure.

FIG. 5 is an isometric view of a wall mount assembly 190 to mount an electronic display 191 on a wall 192 according to an example configuration of the current disclosure. The electronic display 191 is rendered transparent in FIG. 5 for clarity. The wall mount assembly 190 can include a lift mechanism 100 having a fixed portion 110 (e.g., a support column 193) and a movable portion 120 (e.g., a movable bracket 194). The support column 193 can be coupled to the wall 192 and the movable bracket 194 can be slidably engaged with the support column 193. A display mount 195 can be coupled to the movable bracket 194. One or more loads 130 can be coupled to the movable bracket 194 (e.g., the display mount 195 can be adapted to receive the electronic display 191). The lift mechanism 100 can be configured for raising and lowering the electronic display 191 relative to the wall 192.

The lift mechanism 100 of the wall mount assembly 190 of FIG. 5 can also include a counterbalance mechanism 150. The counterbalance mechanism 150 can be located inside the support column 193. The counterbalance mechanism 150 can be coupled between the support column 193 and the movable bracket 194. The counterbalance mechanism 150 can generate a lift force for countering a combined the weight of the load 130 (e.g., the electronic display 191, or the like) and a portion of the lift mechanism 100 (e.g., the weight of the movable bracket 194 and the display mount 195, or the like).

Figure 13:
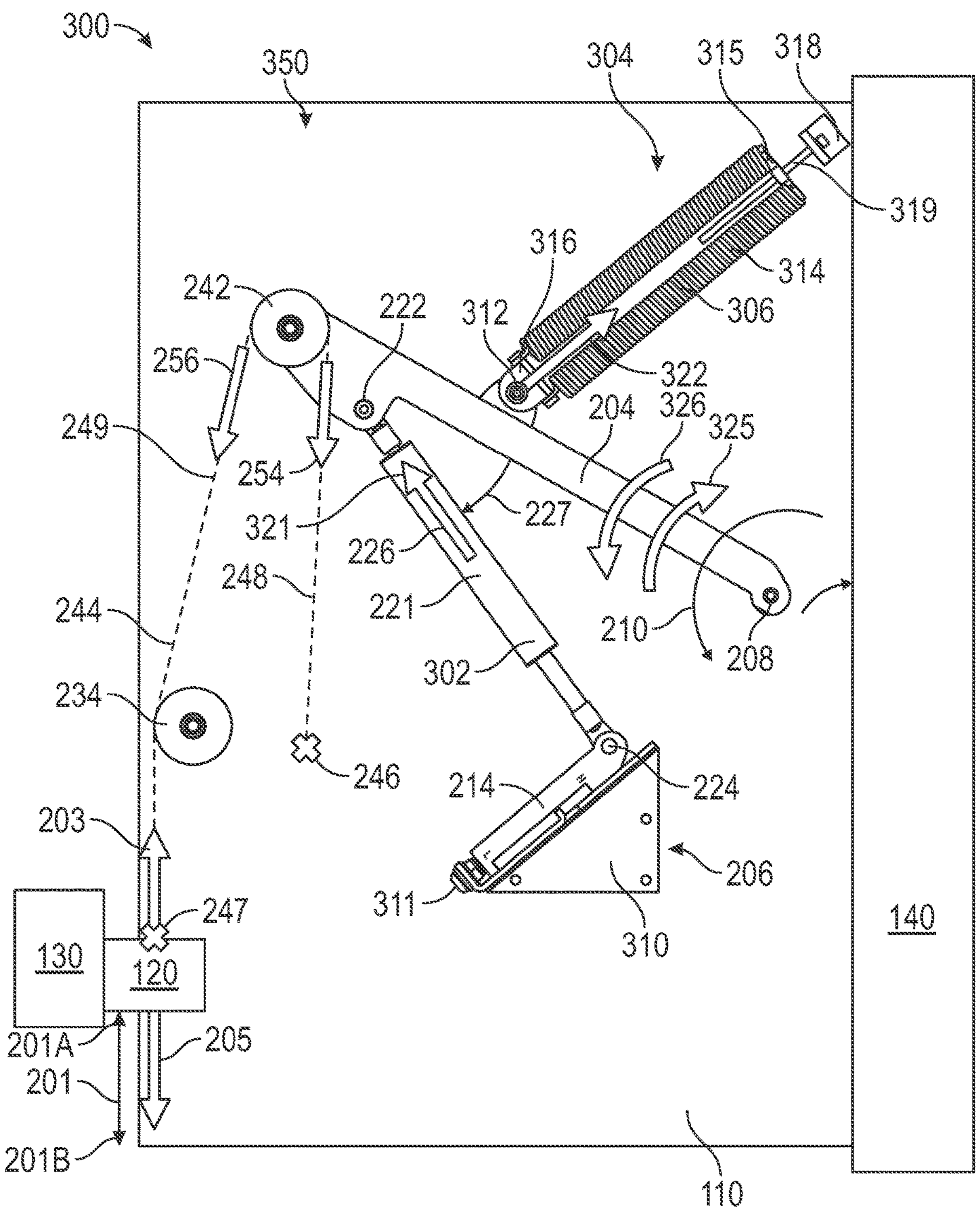
FIG. 13 is a schematic view of a lift mechanisms according to yet another example configuration of the current disclosure.

In each of the applications shown in FIGS. 2-5, it can be appreciated that the load 130 coupled to the movable portion 120 (e.g., the platform, the electronic display, the work surface, or the like) can have wide range of weights. The range of weights can depend on the make and model of the equipment (e.g., the electronic display, or the like), the manufacturing material (e.g., material of the work surface, the platform, or the like). In some example configurations, the force generated by the lift mechanism 100 can be adjustable to accommodate for the wide range of weights. An adjustment of the lift force can be done by various methods including, but not limited to, an adjustment of a tension of an energy storage member included in the counterbalance mechanism (e.g., by adjusting a tension of the one or more springs 314 of the counterbalance mechanism 350 of FIG. 13), an adjustment of an angle of an energy storage member included in the counterbalance mechanism (e.g., by adjusting the spring angle 227 between the gas spring 221 and the arm 204 of the counterbalance mechanism 350 of FIG. 13), or the like. In other configurations, one or more adjustment methods can be employed simultaneously to adjust the lift force, as illustrated in FIG. 13.

Figure 6:
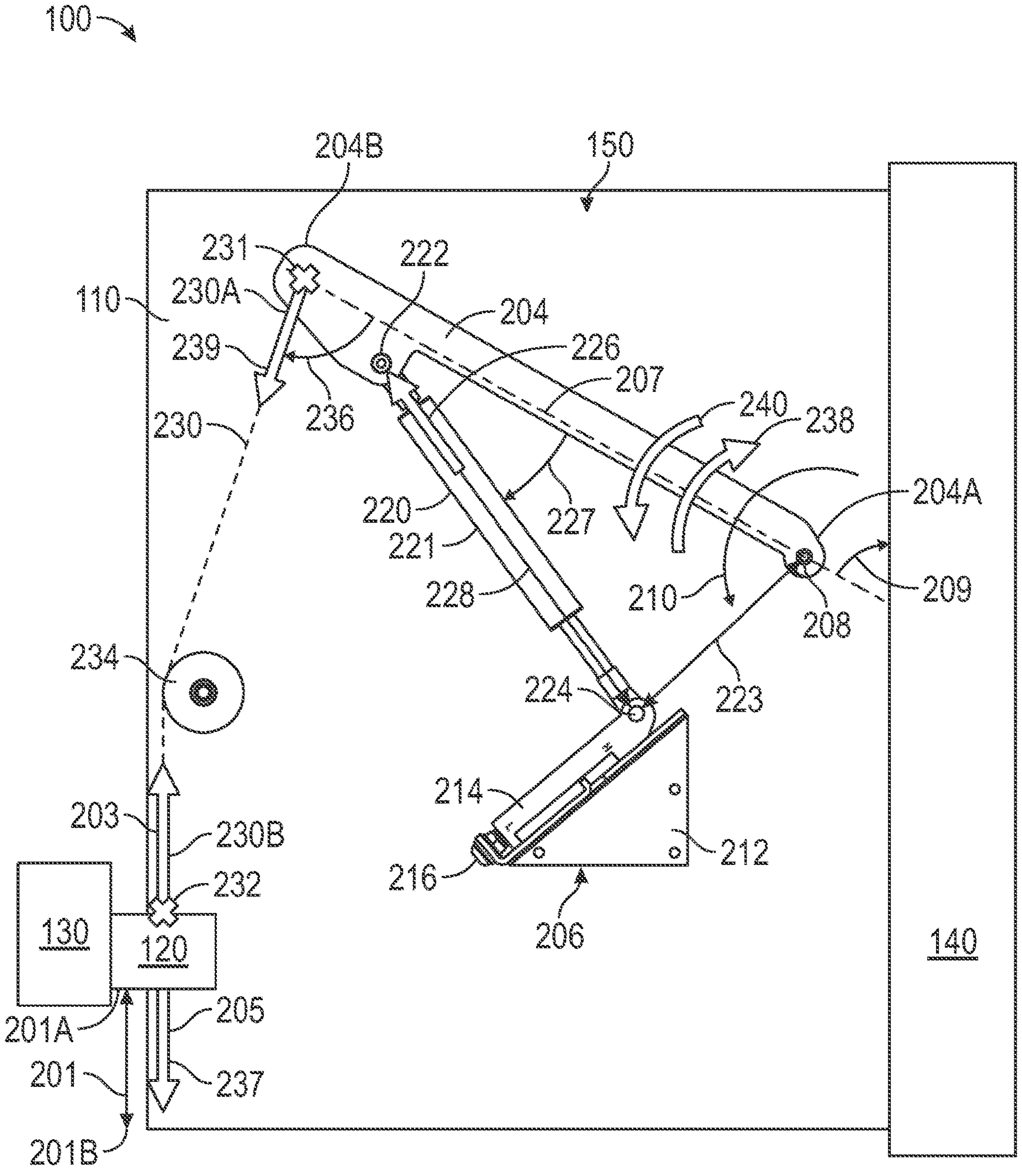
FIG. 6 is a schematic view of a lift mechanism according to an example configuration of the current disclosure.

FIG. 6 is a schematic view of a lift mechanism 100 according to an example configuration of the current disclosure. The lift mechanism 100 can have a fixed portion 110 and a movable portion 120 movably (e.g., slidably, or the like) coupled to the fixed portion 110. The fixed portion 110 can be either directly or indirectly couplable to a structure 140 (e.g., a wall, a wheeled base, or the like). One or more loads 130 (e.g., an electronic display, a platform, a work surface, or the like) can be either directly or indirectly coupled to the movable portion 120. The movable portion 120 can translate relative to the fixed portion 110 through a range of travel 201. Thus, in some example configurations, a positioning apparatus 10 (shown in FIGS. 2-5) including the lift mechanism 100 (illustrated in FIG. 6) can translate the one or more loads 130 relative to the structure 140 by translating the movable portion 120 relative to the fixed portion 110. In each of these example configurations, the movable portion 120 can be configured to translate between a high position 201A and a low position 201B along the range of travel 201.

In some example configurations, the lift mechanism 100 can include a counterbalance mechanism 150. The counterbalance mechanism 150 can be coupled to the fixed portion 110, and the counterbalance mechanism 150 can be operably coupled to the movable portion 120, as illustrated in FIG. 6. The counterbalance mechanism 150 can generate a lift force 203 for countering a combined weight 205 of the one or more loads 130 coupled to the movable portion 120 and the weight of the movable portion 120.

Figure 20:
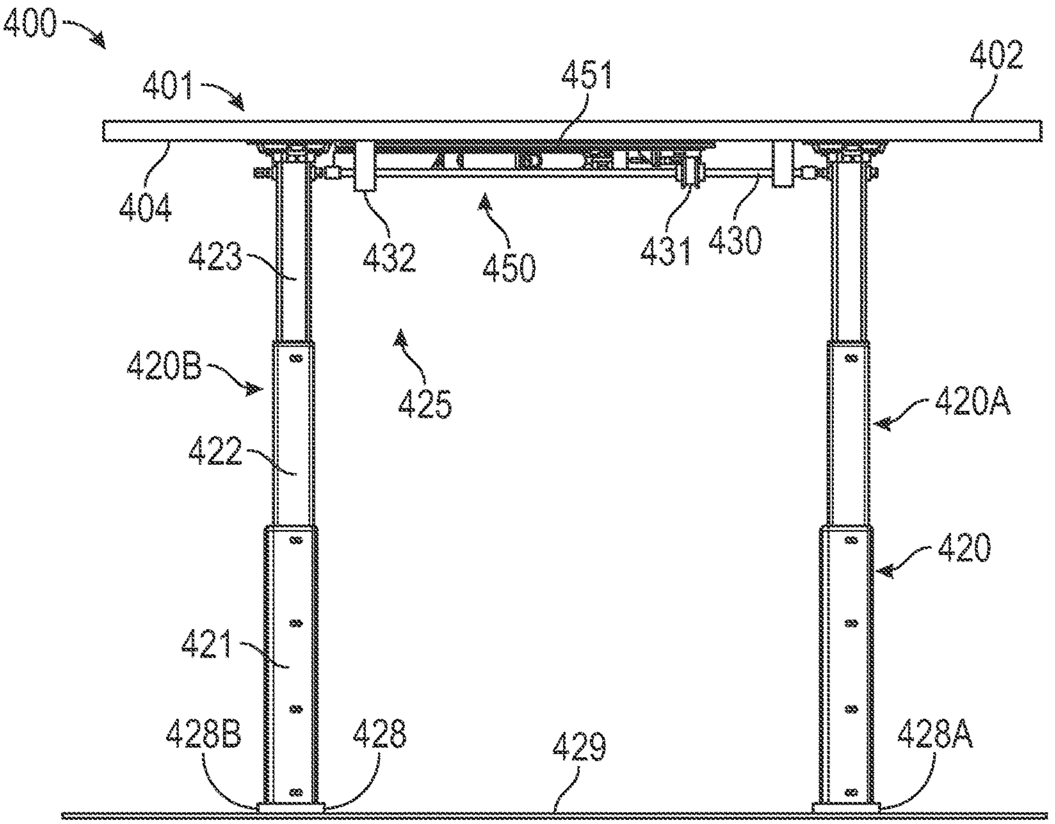
FIG. 20 is a front view of the freestanding workstation of FIG. 17 according to an example configuration of the current disclosure.

In other example configurations, the counterbalance mechanism 150 can be coupled to the movable portion 120 (e.g., coupled to the work surface 402, as illustrated in FIG. 20). In such configurations, the lift force can counter a weight of the counterbalance mechanism 150 in addition to the weights of the one or more loads 130 and the movable portion 120.

In some example configurations, the counterbalance mechanism 150 can include an arm 204 and an adjustment mechanism 206, as illustrated in FIG. 6. The arm 204 can have a first portion 204A and a second portion 204B. The arm 204 can be elongated along an arm axis 207 between the first portion 204A and the second portion 204B of the arm 204. The arm 204 can be made of an engineering material including, but not limited to, a stamped sheet metal, a tube, a die cast bracket, a rod, or the like. The arm 204 can be rotatably coupled to the fixed portion 110 at a first hinge 208 proximate to the first portion 204A. The arm axis 207 can be oriented at an arm angle 209 relative to the fixed portion 110. The arm 204 can be configured to rotate around the first hinge 208 in a first direction 210 such that the arm angle 209 can increase as the movable portion 120 translates from the high position 201A to the low position 201B along the range of travel 201.

The adjustment mechanism 206 can include a bracket 212, a glider 214, and a screw 216. The bracket 212 can be fixedly attached to the fixed portion 110 away from the first hinge 208. The glider 214 can be slidably engaged with the bracket 212. The screw 216 can be coupled to the bracket 212 and threadedly engaged with the glider 214. The glider 214 can be configured to translate relative to the bracket 212 as the screw 216 is rotated.

The lift mechanism 100 can also include an energy storage member 220. In an example configuration, the energy storage member 220 can be a gas spring 221. In other example configurations, the energy storage member 220 can be any one of a compression spring, an extension spring, an elastic band, or the like). The energy storage member 220 can be rotatably coupled with the arm 204 at a second hinge 222, and rotatably coupled with the adjustment mechanism 206 at a third hinge 224. The second hinge 222 can be located between the first portion 204A and the second portion 204B of the arm 204, and the third hinge 224 can be located on the glider 214, as illustrated in FIG. 6.

The third hinge 224 can be configured to move towards or away from the first hinge 208 to adjust a first distance 223 between the first hinge 208 and the third hinge 224 as the glider 214 translates relative to the bracket 212. The second hinge 222 can be configured to move towards (e.g., when the arm 204 rotates in the first direction 210) or away (e.g., when the arm 204 rotates in a second direction opposite the first direction 210) from the third hinge 224 to adjust a second distance 228 between the second hinge 222 and the third hinge 224 as the arm 204 rotates relative to the fixed portion 110.

The energy storage member 220 (e.g., the gas spring 221) can be configured to generate a force (e.g., a gas spring force 226). The gas spring force 226 can apply between the second hinge 222 and the third hinge 224, and the gas spring force 226 can bias the arm 204 to rotate in the second direction opposite the first direction 210. As the second distance 228 decrease when the arm 204 rotates in the first direction 210, the gas spring force 226 can increase.

The energy storage member 220 (e.g., the gas spring 221) can be oriented in an angle (e.g., a spring angle 227) from the arm 204. The spring angle 227 can decrease as the glider 214 translates towards the first hinge 208 to decrease the first distance 223. The spring angle 227 can also decrease as the arm 204 rotates in the first direction 210. In one extreme orientation, the third hinge 224 can be proximate the first hinge 208 in a minimum adjustment configuration. The spring angle 227 can increase as the glider 214 translates away from the first hinge 208 to increase the first distance 223. In the other extreme orientation, the third hinge 224 can be furthest away from the first hinge 208 in a maximum adjustment configuration. The spring angle 227 can be larger in the maximum adjustment configuration compared to the spring angle 227 in the minimum adjustment configuration. The gas spring force 226 can be proportional to the spring angle 227 such that the gas spring force 226 can be larger in the maximum adjustment configuration compared to the gas spring force 226 in the minimum adjustment configuration.

Figure 16:
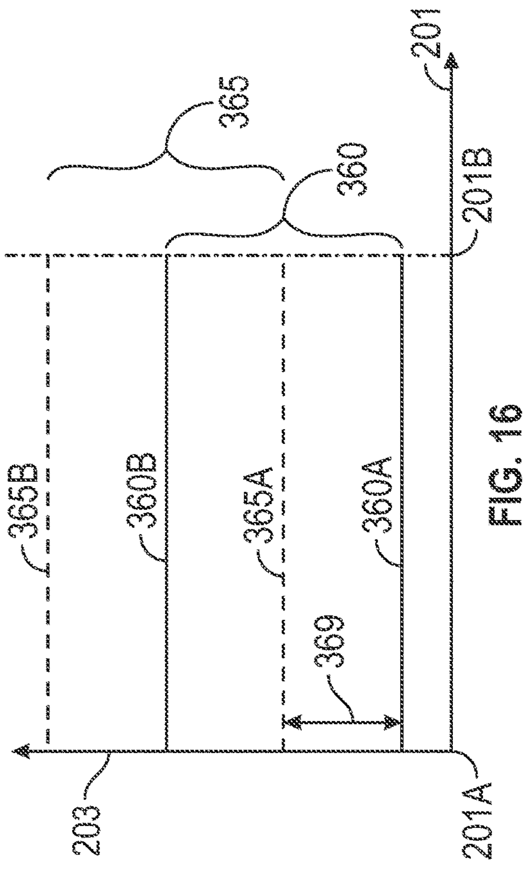
FIG. 16 is a graphical representation of the lift force generated by the lift mechanism of FIG. 13.

The lift force 203 provided by the counterbalance mechanism 150 can be directly proportional to the gas spring force 226. Therefore, the counterbalance mechanism 150 can provide a larger lift force 203 in the maximum adjustment configuration compared to the lift force 203 in the minimum adjustment configuration, as illustrated in FIG. 16. In an example configuration, the third hinge 224 can be located anywhere between the minimum adjustment configuration and the maximum adjustment configuration.

The energy storage member 220 (e.g., the gas spring 221) can extend between the second hinge 222 and the third hinge 224. As the arm 204 rotates around the first hinge 208, the second distance 228 between the second hinge 222 and the third hinge 224 can change causing varying tension (or compression) on the energy storage member 220. As the tension of the energy storage member 220 varies, the energy storage member 220 can apply a varying force to the arm 204 at the second hinge 222. For example, when the arm 204 rotates in the first direction 210, the second distance 228 decreases causing a compression of the gas spring 221, and therefore, increasing the gas spring force 226. Similarly, when the arm 204 rotates in the second direction opposite the first direction 210, the second distance 228 increases causing an extension of the gas spring 221, and therefore, decreasing the gas spring force 226.

In some example configurations, the lift mechanism 100 can also include a cord 230. The counterbalance mechanism 150 can be operably coupled to the movable portion 120 via the cord 230. The cord 230 can extend from a first portion 230A to a second portion 230B. The first portion 230A can be coupled to the arm 204 at a first catch 231, and the second portion 230B can be coupled to the movable portion 120 at a second catch 232. In some example configurations, the first hinge 208 and the first catch 231 can be located on the arm axis 207, and the second hinge 222 can also be located on the arm axis 207 between the first hinge 208 and the first catch 231. In other example configurations, the second hinge 222 can be offset from the arm axis 207 in a transverse direction, as illustrated in FIG. 6. In yet other example configurations, the first catch 231 can be located between the first hinge 208 and the second hinge 222. The cord 230 can be an elongated member made of an engineering material including, but not limited to, a steel rope, a tensile polymer rope, a chain, a cable, string, or the like.

In some example configurations, the lift mechanism can also include a redirect pulley 234. The redirect pulley 234 can be rotatably coupled to the fixed portion 110. The cord 230 can be routed around the redirect pulley 234 between the first portion 230A and the second portion 230B. The first portion 230A of the cord 230 can be oriented in a cord angle 236 from the arm 204, as illustrated in FIG. 6. The cord angle 236 can be defined by the location of the redirect pulley 234 and the first catch 231. The cord angle 236 can vary as the arm 204 rotates around the first hinge 208 such that an orientation of the first catch 231 relative to the redirect pulley 234 changes. The redirect pulley 234 can redirect the cord 230 such that the second portion 230B of the cord 230 can extend between the redirect pulley 234 and the movable portion 120 in a direction parallel to a direction of motion 237 of the movable portion 120.

A force generated by the energy storage member 220 (e.g., the gas spring force 226) can act on the arm 204 at the second hinge 222. The gas spring force 226 can apply a first torque 238 on the arm in a clockwise direction. A cord force 239 supported by the cord 230 can act on the arm 204 at the first catch 231. The cord force 239 can apply a second torque 240 on the arm 204 in a counterclockwise direction. The first torque 238 and the second torque 240 can be equal to keep the arm 204 in balance. From the balance of the arm 204, the cord force 239 can be calculated for a gas spring force 226 at a position of the arm 204 (e.g., at an arm angle 209). The cord force 239 can be equal to the lift force 203. The cord force 239 (or the lift force 203) can be substantially constant (e.g., due to changing the spring angle 227 and changing the cord angle 236) despite the varying gas spring force 226 (e.g., due to varying second distance 228) during the rotation of the arm 204 as the movable portion 120 translates along the range of travel 201.

A portion of the force generated by the energy storage member 220 (e.g., the gas spring force 226) can be supported by the cord 230 (e.g., a cord force 239 defined by the torque balance, as discussed in previous sections). The cord force 239 can define the lift force 203. The lift force 203 can counter at least a portion of the combined weight 205 coupled to the movable portion 120 (e.g., counter the combined weight of the movable portion 120 and the weight of one or more loads 130 coupled to the movable portion 120).

Figure 7:
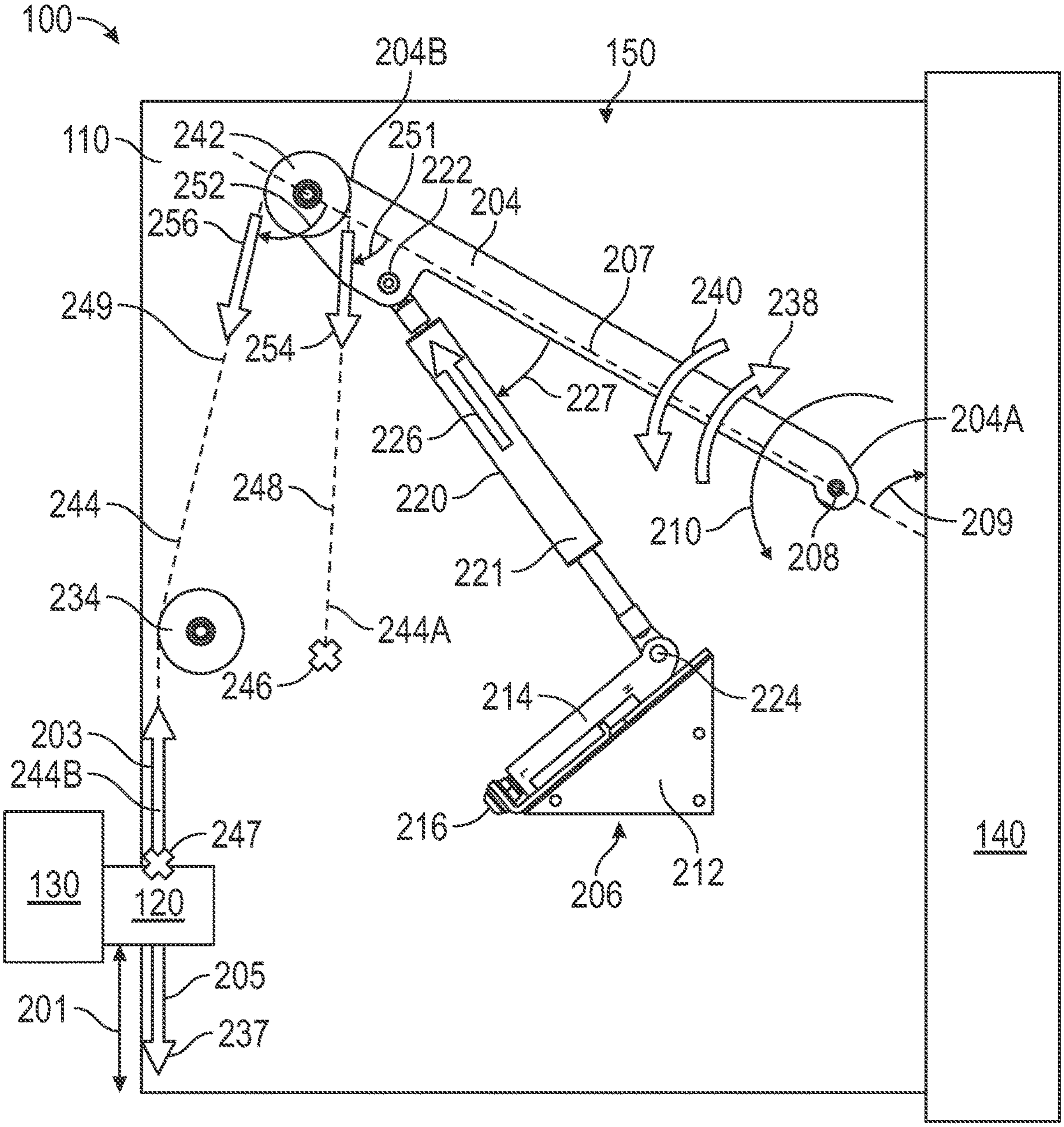
FIG. 7 is a schematic view of a lift mechanism according to another example configuration of the current disclosure.

FIG. 7 is a schematic view of a lift mechanism 100 according to another example configuration of the current disclosure. In some example configurations, the lift mechanism 100 can include an idler pulley 242. The idler pulley 242 can be coupled to the arm 204 proximate the second portion 204B of the arm 204. The counterbalance mechanism 150 can be operably coupled to the movable portion 120 via a cord 244. The cord 244 can be elongated between a first portion 244A and a second portion 244B. The first portion 244A can be coupled to the fixed portion 110 at a first catch 246, and the second portion 244B can be coupled to the movable portion 120 at a second catch 247. The cord 244 can be routed around the idler pulley 242 and the redirect pulley 234 between the first portion 244A and the second portion 244B. A portion of the gas spring force 226 generated by the gas spring 221 can be supported by the cord 244 to define a lift force 203 as discussed below.

The cord 244 can include a first segment 248 and a second segment 249 between the first portion 244A and the second portion 244B, as illustrated in FIG. 7. The first segment 248 can extend between the first catch 246 and the idler pulley 242, and the second segment 249 can extend between the idler pulley 242 and the movable portion 120. The first segment 248 can be oriented in a first cord angle 251 from the arm 204, and the second segment 249 can be oriented in a second cord angle 252 from the arm 204. The first cord angle 251 and the second cord angle 252 can vary as the arm 204 rotates around the first hinge 208.

The second segment 249 can be redirected around the redirect pulley 234 before it can be coupled to the movable portion 120. The second portion 244B of the cord 244 can be parallel to the direction of motion 237 of the movable portion 120. As the movable portion 120 translates along the range of travel 201, the arm 204 can rotate (e.g., rotate in a first direction 210) and a section of the first segment 248 can shift to the second segment 249 over the idler pulley 242 to enable the translation of the movable portion 120. The first segment 248 of the cord 244 can support a first cord force 254 and the second segment 249 of the cord 244 can support a second cord force 256. The first cord force 254 can be equal to the second cord force 256, and a lift force 203 can be equal to the second cord force 256. The lift force 203 can act on the movable portion 120 to counter at least a portion of the combined weight 205 of the movable portion 120 and the weight of the one or more loads 130 coupled to the movable portion 120.

The gas spring force 226 can act on the arm 204 at the second hinge 222 to apply a first torque 238 on the arm 204 in a clockwise direction, as illustrated in FIG. 7. The first cord force 254 and the second cord force 256 can act on the arm 204 over the idler pulley 242 to apply a second torque 240 on the arm 204 in a counterclockwise direction. The first torque 238 and the second torque 240 can be equal to keep the arm 204 in balance. From the balance of the arm 204, the first cord force 238 and the second cord force 240 can be calculated at any position of the arm 204 (e.g., at any arm angle 209 by taking in to account the first cord angle 251 and the second cord angle 252 at that instance of the arm angle 209). The first cord force 254 and the second cord force 256 (and thus, the lift force 203) can be substantially constant despite the varying gas spring force 226 due to varying the first cord angle 251, the second cord angle 252, and the spring angle 227.

FIGS. 8-12 are schematic views of lift mechanisms 101, 102, 103, respectively, according to some example configurations of the current disclosure. The lift mechanism 101, 102, 103 can have a fixed portion 110 and a movable portion 120. The fixed portion 110 can be elongated between a first portion 110A and a second portion 110B. The fixed portion 110 can be mounted on a structure 140 (e.g., a wall 173, as shown in FIG. 3, a wheeled base 163, as shown in FIG. 2, or the like), and one or more loads 130 (e.g., an electronic display 167 or a platform 164, as shown in FIG. 2, a work surface 174, as shown in FIG. 3, or the like) can be coupled to the movable portion 120. The movable portion 120 is configured to translate relative to the fixed portion 110 along a range of travel 201 to provide height adjustment for the one or more loads 130 coupled to the movable portion 120. The movable portion 120 can translate between a high position 201A where the movable portion 120 is proximate the first portion 110A and a low position 201B where the movable portion 120 is proximate the second portion 110B. Various aspects of the lift mechanisms 100 described in previous sections in relation to FIGS. 6-7 can be used in the configurations shown in FIGS. 8-12.

In some example configurations, one or more guide members 260 can be coupled between the fixed portion 110 and the movable portion 120. The one or more guide members 260 can be adapted to guide the movable portion 120 as it translates relative to the fixed portion 110. The one or more guide members 260 can include, but not limited to, slides (e.g., a first slide 261 and a second slide 262, as illustrated in FIG. 10), glides, rollers, or the like.

Figure 8:
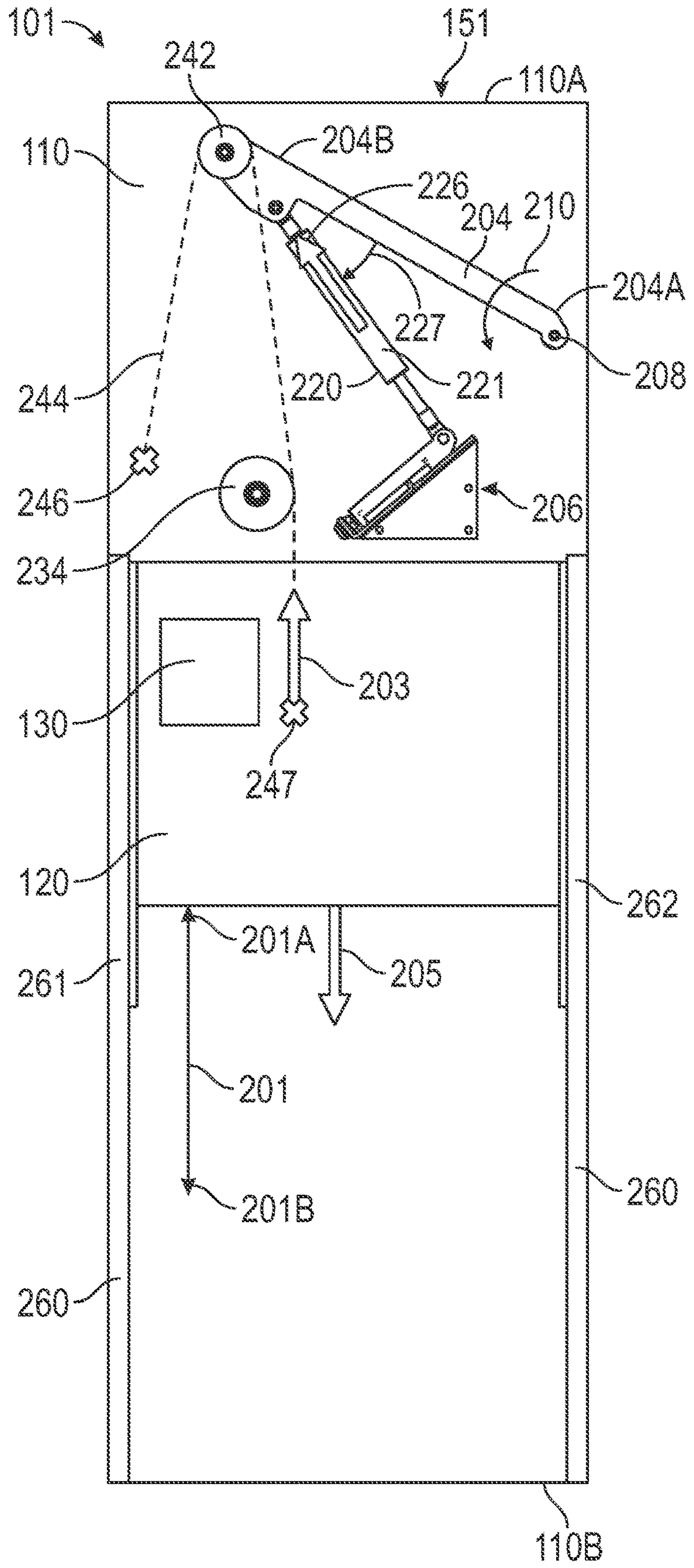
FIG. 8 is a schematic view of a lift mechanisms according to yet another example configuration of the current disclosure.
Figure 9:
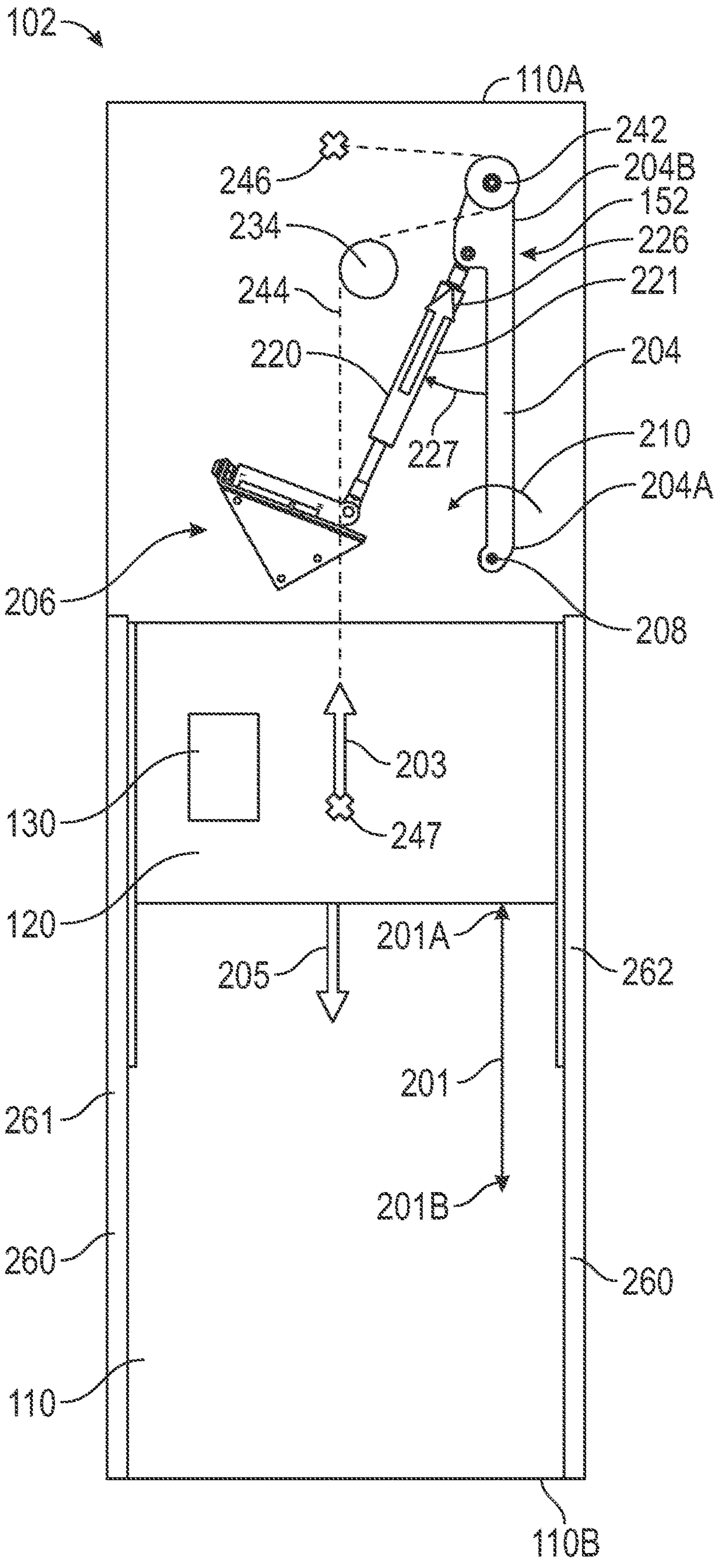
FIG. 9 is a schematic view of a lift mechanisms according to yet another example configuration of the current disclosure.
Figure 10:
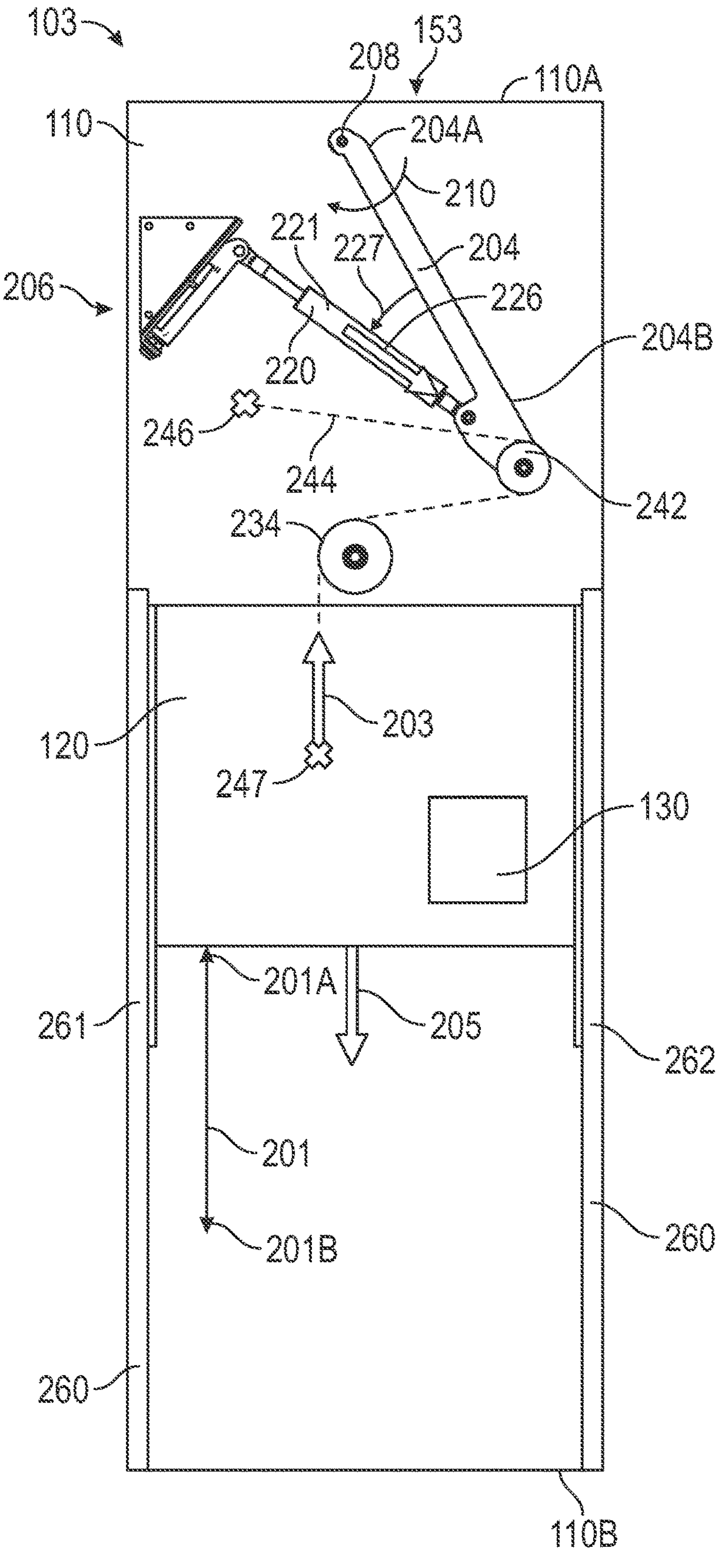
FIG. 10 is a schematic view of a lift mechanisms according to yet another example configuration of the current disclosure.

The lift mechanisms 101, 102, 103 of FIGS. 8-10 can include counterbalance mechanisms 151, 152, 153, respectively. The counterbalance mechanisms 151, 152, 153 can be similar to the counterbalance mechanism 150 of FIG. 7. The counterbalance mechanisms 151, 252, 153 can be positioned in different orientations relative to the fixed portion 110 and movable portion 120, however, one or more aspects of the counterbalance mechanism 150 of FIG. 7 can apply to the counterbalance mechanisms 151, 152, 153 of FIGS. 8-10. In some example configurations, the counterbalance mechanisms 151, 152, 153 can be located proximate the first portion 110A of the fixed member 110, as illustrated in FIGS. 8-10. In other example configurations, the counterbalance mechanism can be located proximate the second portion 110B of the fixed member 110.

In some example configurations, the first hinge 208 located proximate the first portion 204A of the arm 204 can be placed away from the first portion 110A of the fixed portion 110, and the arm 204 can extend from the first hinge 208 towards the first portion 110A of the fixed portion 110 placing the second portion 204B of the arm 204 proximate the first portion 110A of the fixed portion 110, as illustrated in FIGS. 8-9. In other configurations, the first hinge 208 can be placed proximate the first portion 110A of the fixed portion 110, and the arm 204 can extend from the first hinge 208 away from the first portion 110A of the fixed portion 110 placing the second portion 204B of the arm 204 proximate the center of the fixed portion 110, as illustrated in FIG. 10. It can be appreciated that the counterbalance mechanism can be placed in many other orientations relative the fixed portion 110 and the movable portion 120. In each configuration, the counterbalance mechanism can be operably coupled to the movable portion 120 via a cord 244. The arm 204 can rotate in a first direction 210 as the movable portion 120 translates from the high position 201A towards the low position 201B. The energy storage member 220 can bias the arm 204 to rotate in a second direction opposite the first direction 210.

Figure 11:
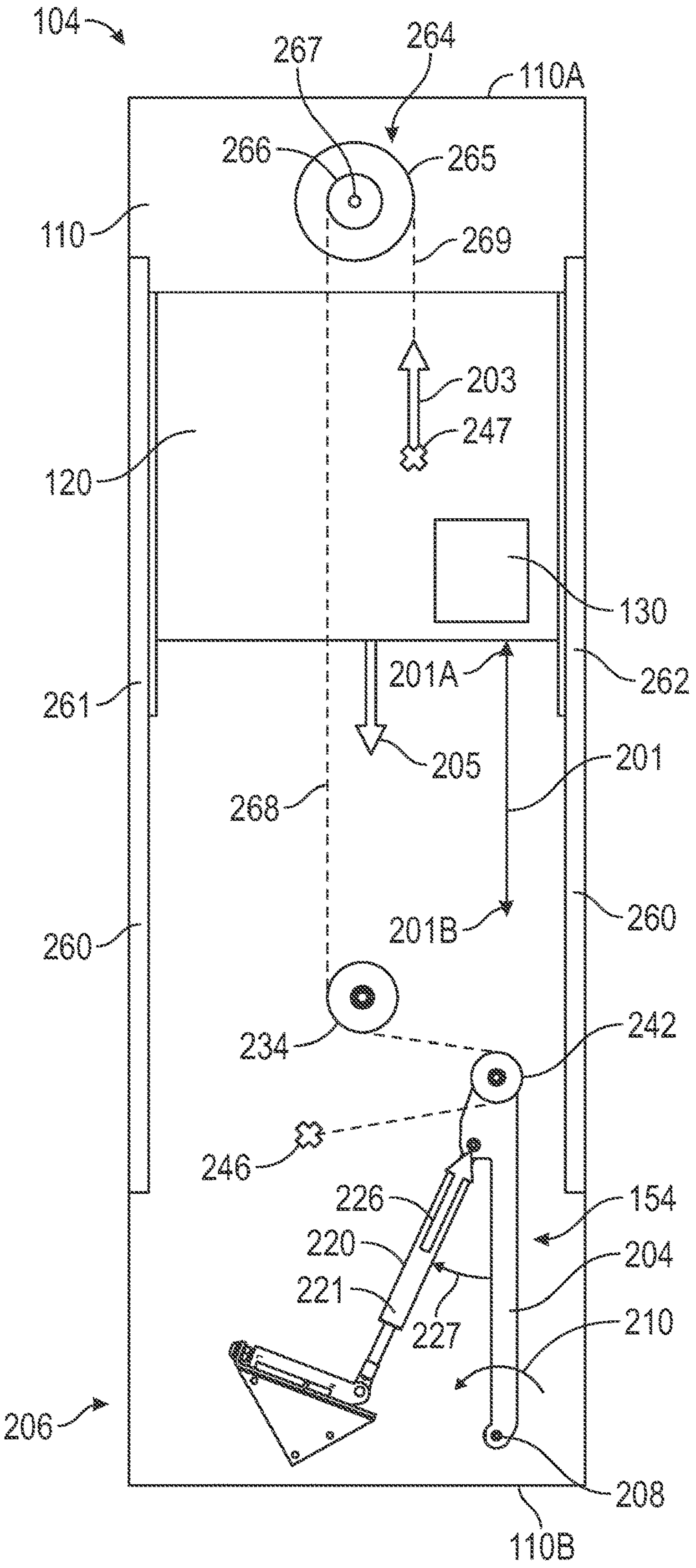
FIG. 11 is a schematic view of a lift mechanisms according to yet another example configuration of the current disclosure.
Figure 12:
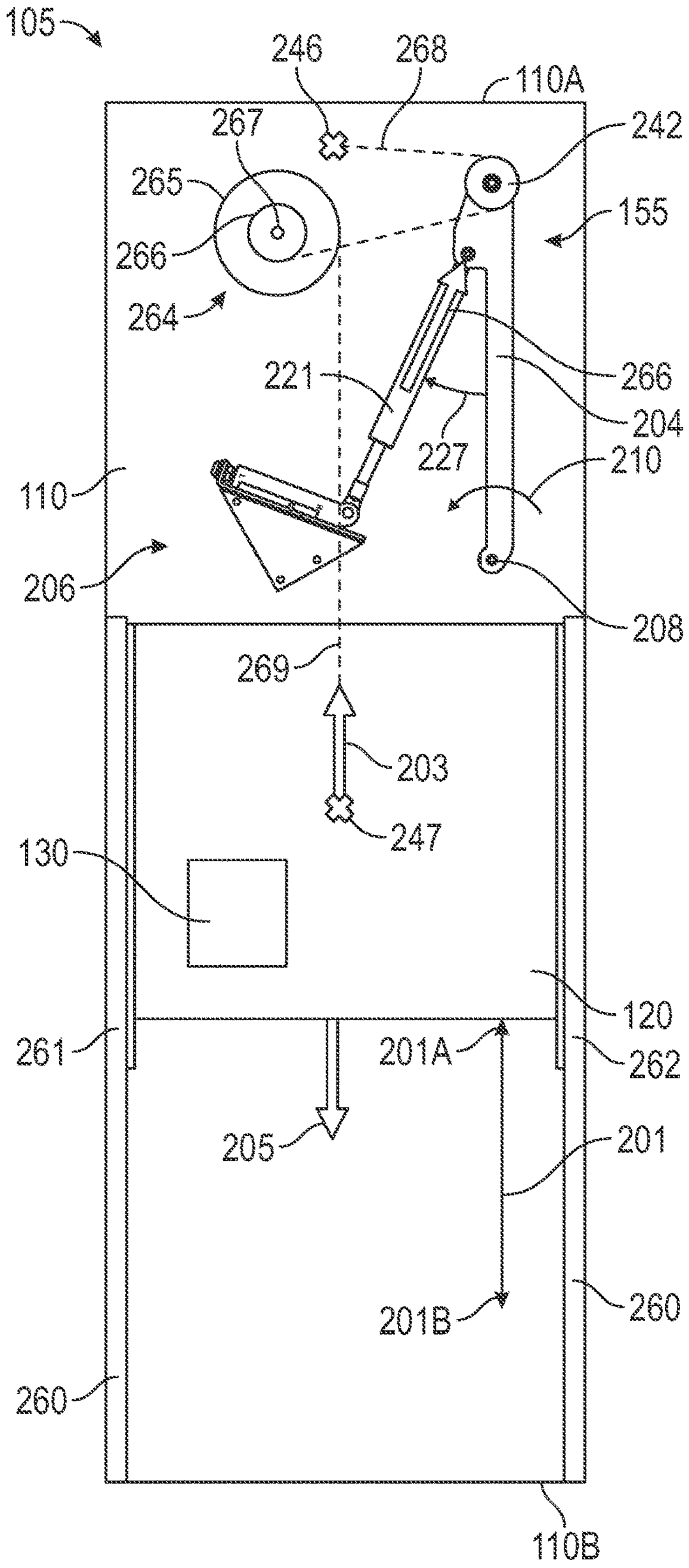
FIG. 12 is a schematic view of a lift mechanisms according to yet another example configuration of the current disclosure.

FIGS. 11-12 are schematic views of the lift mechanisms 104, 105, respectively, according to some example configurations of the current disclosure. In some example configurations, the lift mechanisms 104, 105 can include a transition pulley assembly 264. The transition pulley assembly 264 can be located proximate the first portion 110A of the fixed portion 110, as illustrated in FIGS. 11-12. The transition pulley assembly 264 can be rotatably coupled to the fixed portion 110. The transition pulley assembly 264 can include a first pulley 265 and a second pulley 266. The first pulley 265 can have a larger diameter compared to the second pulley 266. The first pulley 265 can be coaxial with the second pulley 266, and they can rotate in unison about a common axis 267 relative to the fixed portion 110.

In some example configurations, the counterbalance mechanism 154 can be located proximate the second portion 110B of the fixed portion 110, as illustrated in FIG. 11, and in other configurations, the counterbalance mechanism 155 can be located proximate the first portion 110A of the fixed portion 110, as illustrated in FIG. 12. The lift mechanisms 104, 105 can include a first cord 268 and a second cord 269. One end of the first cord 268 can be coupled to the fixed portion 110 at a first catch 246. The first cord 268 can be routed around the idler pulley 242 and optionally routed around the redirect pulley 234, and the other end of the first cord 268 can be coupled to the second pulley 266 of the transition pulley assembly 264. One end of the second cord 269 can be coupled to the movable portion 120 at a second catch 247, and the other end of the second cord 269 can be coupled to the first pulley 265 of the transition pulley assembly 264. The second cord 269 can be wrapped around the first pulley 265 when the movable portion 120 is in the high position 201A (e.g., when the movable portion 120 is proximate the first portion 110A of the fixed portion 110). As the movable portion 120 translates relative to the fixed portion 110 in the range of travel 201, the movable portion 120 can pull on the second cord 269 to rotate the transition pulley assembly 264 in a clockwise direction. As the transition pulley assembly 264 rotates in a clockwise direction, the first cord 268 can wrap around the second pulley 266 enabling the arm 204 to rotate in a first direction 210 about a first hinge 208.

The energy storage member 220 (e.g., the gas spring 221) of FIGS. 8-12 can be coupled between the arm 204 and the adjustment mechanism 206. The energy storage member 220 can apply a force (e.g., the gas spring force 226) to the arm 204 biasing it in a direction opposite the first direction 210. From the balance of the arm 204, the spring force 226 can be converted to a lift force 203 as discussed in previous sections. If the lift mechanism 100 includes a transition pulley assembly 264, as illustrated in FIGS. 11-12, the lift force 203 can be a adjusted by a ratio of the radius of the second pulley 266 to the radius of the first pulley 265. The lift force 203 can apply to the movable portion 120 to counter a portion of the combined weights 205 of the one or more loads 130 coupled to the movable portion 120 and the weight of the movable portion 120.

FIG. 13 is a schematic view of a lift mechanism 300 according to yet another example configuration of the current disclosure. The lift mechanism 300 of FIG. 13 can include one or more aspects of the lift mechanism 100 of FIG. 7. The lift mechanism 300 can have a fixed portion 110 coupled to a structure 140, a movable portion 120 adapted to receive one or more loads 130, and a counterbalance mechanism 350. The movable portion 120 can be configured to translate relative to the fixed portion 110 along a range of travel 201 between a high position 201A and a low position 201B. The movable portion 120 can provide height adjustment for the one or more loads 130 coupled to the movable portion 120 relative to the structure 140.

In some example configurations, the counterbalance mechanism 350 can include an arm 204, a first energy storage member 302, an adjustment mechanism 206, and a booster assembly 304. The arm 204 can be rotatably coupled to the fixed portion 110 around a first hinge 208. The arm 204 can be operably coupled to the movable portion 120 via a cord 244. The cord 244 can be coupled to the fixed portion 110 at a first catch 246 and coupled to the movable portion 120 at a second catch 247. The cord 244 can be routed around the idler pulley 242 and the redirect pulley 234 between the first catch 246 and the second catch 247, as illustrated in FIG. 13. The arm 204 can be configured to rotate in a first direction 210 as the movable portion translates from the high position 201A to the low position 201B.

The adjustment mechanism 206 can include a first bracket 310 and a glider 214. The first bracket 310 can be the same as the bracket 212 of FIG. 7. The first bracket 310 can be fixedly attached to the fixed portion 110. The glider 214 can be slidably engaged with the first bracket 310. The adjustment mechanism 206 can include a first screw 311. The first screw 311 can be rotatably coupled to the first bracket 310 and threadedly engaged with the glider 214.

The first energy storage member 302 can be coupled to the arm 204 at a second hinge 222 on one end and coupled to the glider 214 at a third hinge 224 on the other end. The first energy storage member 302 can be one of a gas spring 221, an extension spring, a compression spring, or the like. The first energy storage member 302 can indirectly define a portion of a lift force 203 as described in previous sections. The first screw 311 is configured to translate the glider 214 relative to the first bracket 310 to change a spring angle 227 between the first energy storage member 302 (e.g., gas spring 221) and the arm 204.

The booster assembly 304 can be coupled to the fixed portion 110 on one end and rotatably coupled to the arm 204 at a fourth hinge 312 on the other end, as illustrated in FIG. 13. The booster assembly 304 can apply and additional force to the arm 204 to increase the lift force 203 as it will be apparent in the following sections.

The booster assembly 304 can include a second energy storage member 306. The second energy storage member 306 can include a gas spring, an extension spring, a compression spring, or the like. In some example configurations, the second energy storage member 306 can be selectively activated to enable lifting heavier loads.

In some example configurations, the second energy storage member 306 can include one or more springs 314 (e.g., one or more extension springs). The one or more springs 314 can be coupled to a first spring plate 315 on one end and coupled to a second spring plate 316 on the other end. The first spring plate 315 can be coupled to the fixed portion 110, and the second spring plate 316 can be rotatably coupled to the arm 204 at the fourth hinge 312.

In some example configurations the counterbalance mechanism 350 can also include a second bracket 318. The second bracket 318 can be fixedly attached to the fixed portion 110. A second screw 319 can be rotatably coupled to the second bracket 318 and threadedly engaged with the first spring plate 315. The second screw 319 can be configured to translate the first spring plate 315 along an axial direction of the second screw 319 when the second screw 319 is rotated to enable adjusting a tension of the one or more springs 314.

A first force 321 generated by the first energy storage member 302 (e.g., similar to the gas spring force 226 of FIG. 7) and a second force 322 generated by the second energy storage member 306 (e.g., a force generated by the one or more springs 314) can apply a first torque 325 on the arm 204 in a second direction opposite the first direction 210. A first cord force 254 and a second cord force 256 carried by the first segment 248 and the second segment 249 of the cord 244, respectively, can apply a second torque 326 on the arm 204 in the first direction 210. The first cord force 325 and the second cord force 326 can be equal. To maintain the arm 204 in balance, the first torque 325 can be equal to the second torque 326, and thus, the first cord force 325 and the second cord force 326 can be calculated from the balance of the arm 204. The second cord force 326 can be equal to the lift force 203. The lift force 203 can counter at least a portion of the combined weight 205 coupled to the movable portion 120.

Figure 15:
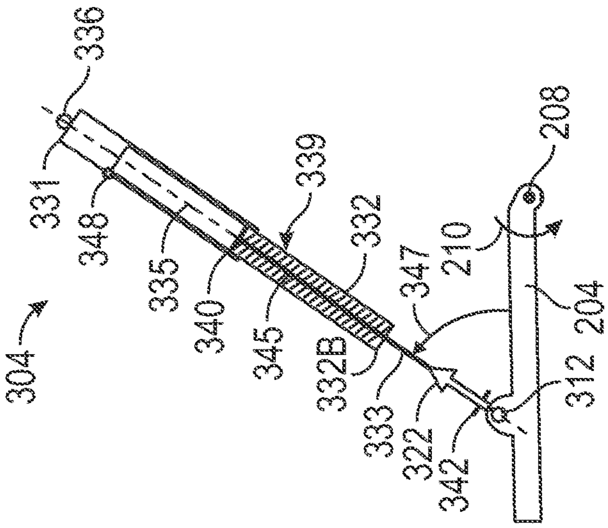
FIG. 15 is a schematic view of the booster assembly of FIG. 14 in an activated configuration.
Figure 14:
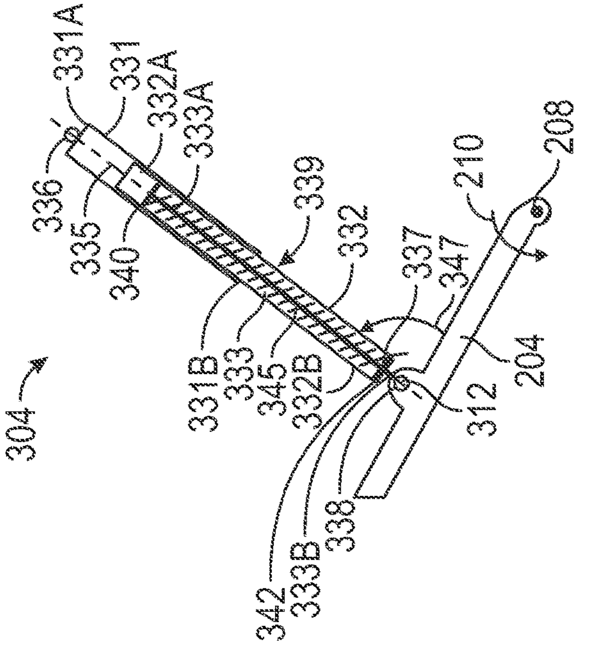
FIG. 14 is a schematic view of a booster assembly according to an example configuration of the current disclosure.

FIGS. 14-15 are schematic views of a booster assembly 304 according to an example configuration of the current disclosure. The booster assembly 304 can include a first tube 331, a second tube 332 and a rod 333. The first tube 331, the second tube 332, and the rod 333 can be concentric about a booster axis 335.

The first tube 331 can be elongated between a first end 331A and a second end 331B. The first end 331A of the first tube 331 can be closed off and a first ring 336 can be fixedly attached to the first end 331A. The first tube 331 can be rotatably coupled to the fixed portion 110 at the first ring 336 (e.g., rotatably coupled with the second bracket 318 of FIG. 13). The second end 331B of the first tube 331 can be open, and the second end 331B can be adapted to receive the second tube 332.

The second tube 332 can be elongated between a first end 332A and a second end 332B. The first end 332A of the second tube 332 can be adapted to be inserted into the first tube 331 through the opening on the second end 331B of the first tube 331. The second end 332B of the second tube 332 can be closed off and an aperture 337 can be formed on the second end 332B. The second tube 332 can be at least partially located inside the first tube 331. The second tube 332 can be slidably engaged with the first tube 331, and the second tube 332 can be configured to translate relative to the first tube 331 along the booster axis 335.

The rod 333 can be elongated between a first end 333A and a second end 333B. The rod 333 can be inserted in to the second tube 332 through the aperture 337 located on the second end 332B of the second tube 332. The rod 333 can be at least partially located inside the second tube 332. The first end 333A of the rod 333 can be located inside the second tube 332, and the second end 333B of the rod 333 can extend out of the second end 332B of the second tube 332. A second ring 338 can be fixedly attached to the second end 333B of the rod 333. The rod 333 can be rotatably coupled with the arm 204 at the second ring 338 (e.g., rotatably coupled with the arm 204 at the fourth hinge 312). The rod 333 can be slidably engaged with the second tube 332, and the rod 333 can be configured to translate relative to the second tube 332 along the booster axis 335.

The first tube 331, the second tube 332 and the rod 333 can be slidably engaged with each other to form a telescoping tube assembly 339. The second tube 332 can telescope out of the first tube 331, and the rod 333 can telescope out of the second tube 332, as illustrated in FIG. 15. The telescoping tube assembly 339 can be coupled between the second bracket 318 (shown in FIG. 13) and the fourth hinge 312 located on the arm 204.

A first brace 340 and a second brace 342 can be coupled to the rod 333 proximate the first end 333A and the second end 333B, respectively. The first brace 340 can be located inside the second tube 332 proximate the first end 332A, and the second brace 342 can be located outside the second tube 332 proximate the second end 332B, as illustrated in FIG. 14. The second end 332B of the second tube 332 can be adapted to rest on the second brace 342.

The booster assembly 304 can also include a compression spring 345. The compression spring 345 can be located inside the second tube 332, and the compression spring 345 can be concentric with the second tube 332. The rod 333 can be at least partially located inside the compression spring 345. The compression spring 345 can be coupled to the first brace 340 on one end and coupled to the second end 332B of the second tube 332 on the other end. In some example configurations, the compression spring 345 can compress between the first brace 340 and the second end 332B of the second tube 332 to bias the second tube 332 towards the second brace 342.

The booster assembly 304 can be configured to form an approach angle 347 between the telescoping tube assembly 339 and the arm 204. The approach angle 347 can vary as the arm 204 rotates around the first hinge 208 in the first direction 210, as illustrated in FIGS. 14-15.

In some example configurations, the booster assembly 304 can include a clasp 348, as illustrated in FIG. 15. The clasp 348 can be coupled to the first tube 331 and selectively coupled to the second tube 332. The clasp 348 can be a mechanical component including, but not limited to a fastener, a hook, a catch, a tie, a peg, or the like. The clasp 348 can be coupled to an actuator (e.g., a mechanical actuator, including, but not limited to, a handle, a lever, or the like, or an electronic actuator, including, but not limited to, an electric motor, a solenoid, or the like).

The booster assembly 304 can have a locked configuration and an unlocked configuration. In the locked configuration of the booster assembly 304, the clasp 348 can be adapted to engage with both the first tube 331 and the second tube 332 to immobilize the second tube 332 relative to the first tube 331. In the unlocked configuration of the booster assembly 304, the clasp 348 can disengage from one or both of the first tube 331 and the second tube 332. In the unlocked configuration, the second tube 332 can be free to translate relative to the first tube 331 along the booster axis 335. The clasp 348 can be selectively actuated to put the booster assembly 304 in the locked configuration.

In some example configurations, the clasp 348 can be actuated when the movable portion 120 is in a high position 201A. When the clasp 348 is actuated, the booster assembly 304 can be activated to provide additional lift force 203.

When the booster assembly 304 is activated, the second tube 332 cannot translate relative to the first tube 331 as the arm 204 rotates in a first direction 210 during the translation of the movable portion 120, as illustrated in FIG. 15. However, the rod 333 is coupled to the arm 204, and the rod 333 can translate relative to the second tube 332 as the arm 204 rotates in the first direction 210. A distance between the first brace 340 and the second end 332B of the second tube 332 where the compression spring 345 is located can decrease, as illustrated in FIG. 15, causing a compression of the compression spring 345. As a result, a second force 322 can be created by the compression spring 345 on the rod 333 in the axial direction of the rod 333 (e.g., in the direction of the booster axis 335). The second force 322 created by the booster assembly 304 can apply to the arm 204 at the fourth hinge 312, as illustrated in FIGS. 13 and 15.

FIG. 16 is a graphical representation of the lift force 203 generated by the counterbalance mechanism 350 of FIG. 13. The lift force 203 can apply to the movable portion 120 to counter at least a portion of the combined weight 205 (e.g., counter the combined weight of the one or more loads 130 coupled to the movable portion 120 and the weight of the movable portion 120) throughout the range of travel 201 from a high position 201A to a low position 201B. The lift force 203 can be constant despite an increase in the first force 321 (e.g., the gas spring force 226 generated by the gas spring 221 of FIG. 13) and an increase in the second force 322 generated by the one or more springs 314 of FIG. 13.

The lift force 203 can have a low force range 360 and a high force range 365. When the booster assembly 304 is inactivated (e.g., the clasp 348 is not actuated, and the second tube 332 can move relative to the first tube 331), the lift force 203 can only be generated by the first energy storage member 302 (e.g., generated by the gas spring 221), and therefore, the lift force 203 can be in the low force range 360. The third hinge 224 can be oriented between a minimum adjustment configuration and a maximum adjustment configuration by manipulating the adjustment mechanism 206 (e.g., by moving the third hinge 224 towards or away from the first hinge 208, respectively, by rotating the first screw 311) to vary the lift force 203 between a minimum lift force 360A and a maximum lift force 360B within the low force range 360. When the booster assembly 304 is activated (e.g., the clasp 348 is actuated and second tube 332 is stationary relative to the first tube 331), the lift force 203 can be generated by both the first energy storage member 302 and the booster assembly 304, and therefore, the lift force 203 can be in the high force range 365. When activated, the booster assembly 304 can cause a force increase 369 to put the lift force 203 in the high force range 365. In the high force range 365, the adjustment mechanism 206 can still be manipulated (e.g., by rotating the first screw 311) to vary the lift force 203 between a minimum lift force 365A and a maximum lift force 365B within the high force range 365.

Figure 17:
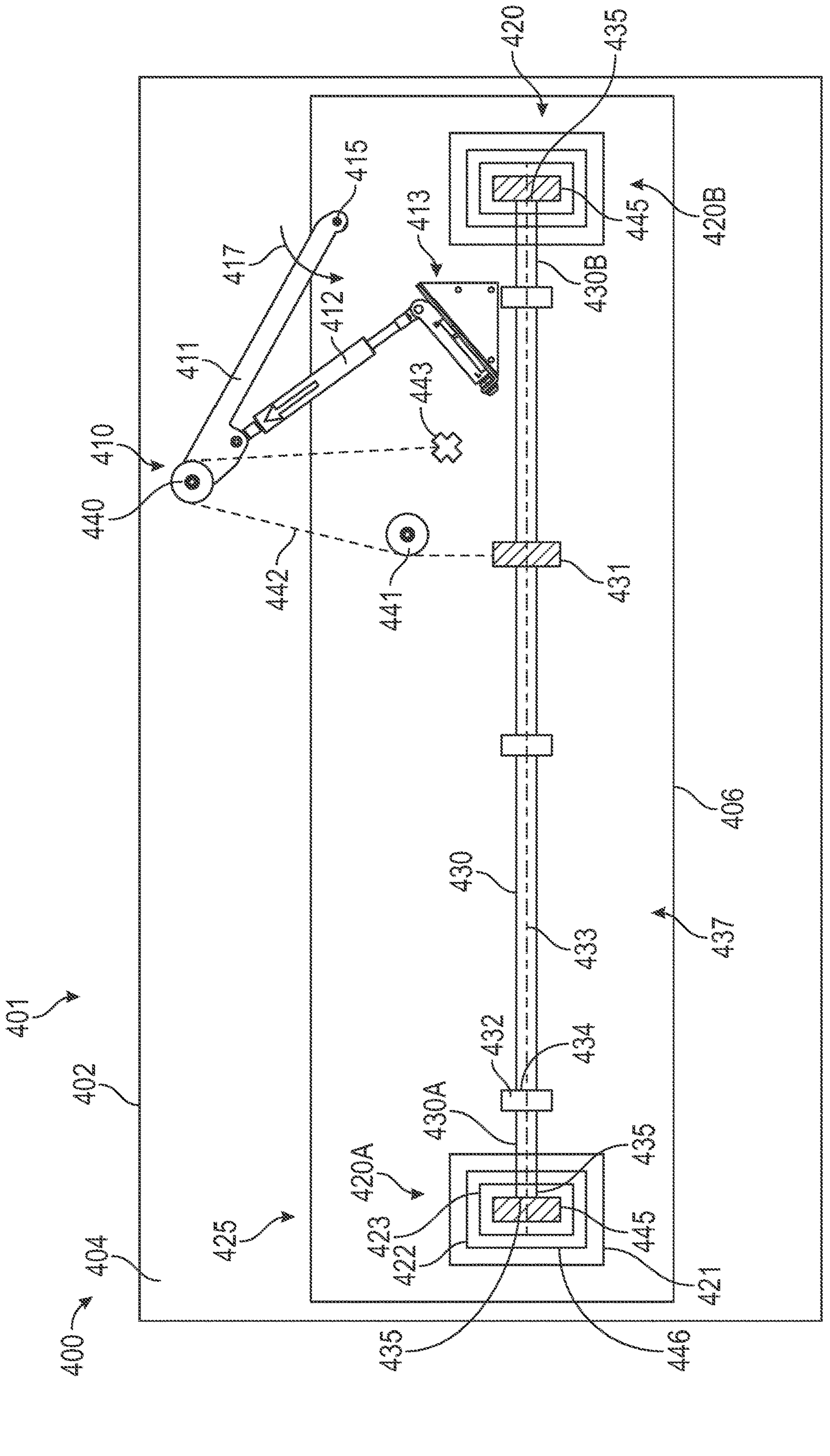
FIG. 17 is a schematic view of the lift mechanism of a freestanding workstation according to an example configuration of the current disclosure.

FIG. 17 is a schematic view of a lift mechanism 401 (e.g., the lift mechanism 100 of the freestanding workstation 180 of FIG. 4) according to an example configuration of the current disclosure. The lift mechanism 401 can use one or more aspects of the lift mechanisms discussed in previous sections in relation to FIGS. 6-16. The lift mechanism 401 can include a counterbalance mechanism 450, one or more leg assemblies 420, and a height adjustment mechanism 425. The height adjustment mechanism 425 can be at least partially located inside the one or more leg assemblies 420 and operably coupled between the one or more leg assemblies 420 and the counterbalance mechanism 410. The one or more leg assemblies 420 can be constructed in different forms including, but not limited to, two-member telescoping legs (e.g., the leg assembly 500 of FIG. 22), three-member telescoping legs (e.g., the leg assembly 520 of FIG. 23), or the like. Depending on the construction of the one or more leg assemblies 420, the height adjustment mechanism 425 can also take different forms, as illustrated in FIGS. 22-23.

The counterbalance mechanism 410 can be coupled to an underside 404 of a work surface 402 (e.g., coupled to the underside 188 of the work surface 175 of the freestanding workstation 180 of FIG. 4). In some example configurations, a frame 406 can be coupled to the underside 404, and the counterbalance mechanism 410 can be coupled to the frame 406, as illustrated in FIG. 17.

In some example configurations, the one or more leg assemblies 420 can include a first member 421, a second member 422, and a third member 423. The first member 421, the second member 422, and the third member 423 can be slidably engaged with each other to adjust a height of the one or more leg assemblies 420, as illustrated in FIG. 20. The third member 423 can be coupled to the work surface 402, and the first member 421 can be coupled to one or more feet 428 (shown in FIG. 20). In other example configurations, the one or more leg assemblies 420 can include a first member 421 and a second member 422. The second member 422 can be slidably engaged with the first member 421. The second member 422 can be coupled to the work surface 402, and the first member 421 can be coupled to one or more feet 428. The one or more feet 428 can be positioned on a floor 429. The work surface 402 coupled to the one or more leg assemblies 420 and one or more feet 428 can form a freestanding workstation 400.

The height adjustment mechanism 425 can be at least partially located inside the one or more leg assemblies 420 (e.g., the height adjustment mechanisms 503 and 524 of FIGS. 22-23). In some example configurations, the height adjustment mechanism 425 can include a synchronizing bar 430. The synchronizing bar 430 can extend between a first leg assembly 420A and a second leg assembly 420B and enable the synchronization of a movement of the first leg assembly 420A with a movement of the second leg assembly 420B. The height adjustment mechanism 425 can cooperate with the counterbalance mechanism 410 to adjust a length of the one or more leg assemblies 420 to provide height adjustment for the frame 406 and the work surface 402 relative to the floor 429.

In some example configurations, the counterbalance mechanism 410 can include an arm 411, a gas spring 412 and an adjustment mechanism 413, as illustrated in FIG. 17. The counterbalance mechanism 410 can use one or more aspects of the counterbalance mechanism 150 of FIG. 7. The arm 411 can be rotatably coupled to the frame 406 at a first hinge 415. The arm 411 can be operably coupled to the one or more leg assemblies 420, and the arm 411 can be configured to rotate in a first direction 417 or in a second direction opposite the first direction 417 as the frame 406 and the work surface 402 transports towards or away from the floor 429, respectively.

The adjustment mechanism 413 can be coupled to the frame 406, and the gas spring 412 can be coupled between the arm 411 and the adjustment mechanism 413. The adjustment mechanism 413 can be configured to adjust an angle between the gas spring 412 and the arm 411 as discuss in previous sections (e.g., change the spring angle 227 of FIG. 6). The gas spring 412 can bias the arm 411 to rotate in a second direction opposite the first direction 417.

In some example configurations, the height adjustment mechanism 425 can include a driving pulley assembly 437.

The driving pulley assembly can include a wheel 431, and one or more bushings 432 coupled to the synchronizing bar 430, as illustrated in FIG. 17. The synchronizing bar 430 can be elongated between a first end 430A and a second end 430B along a bar axis 433. The one or more bushings 432 having an aperture 434 can be fixedly attached to the frame 406. In other example configurations, the one or more bushings 432 can be directly coupled to the underside 404 of the work surface 402. The wheel 431 can be concentric with the synchronizing bar 430 and the wheel 431 can be fixedly attached to the synchronizing bar 430 between the first end 430A and the second end 430B.

The synchronizing bar 430 can be inserted through the aperture 434 located on the one or more bushings 432. The one or more bushings 432 can hold the synchronizing bar 430 at a distance from the underside 404 of the work surface 402 and enable the synchronizing bar 430 to freely rotate about the bar axis 433 relative to the work surface 402. The wheel 431 can be adapted to rotate with the synchronizing bar 430 in unison relative to the work surface 402.

The bar axis 433 can be substantially horizontal and parallel to the work surface 402. The synchronizing bar 430 can be made of an engineering material including, but not limited to, a steel rod or tube, an aluminum rod or tube, or the like. A key 435 (e.g., a key shaped as one of a square, a rectangle, a hexagon, a star, an oval, a triangle, a polygon, or the like) can be formed proximate the first end 430A and the second end 430B of the synchronizing bar 430. The key 435 can be adapted to engage with the one or more leg assemblies 420.

The synchronizing bar 430 can be coupled to the one or more leg assemblies 420 (e.g., coupled to the first leg assembly 420A and the second leg assembly 420B proximate the first end 430A and the second end 430B of the synchronizing bar 430, respectively). The synchronizing bar 430 can cooperate with the one or more leg assemblies 420 to rotate about the bar axis 433 relative to the work surface 402 as the work surface 402 translate relative to the floor 429.

In some example configurations, the counterbalance mechanism 410 can include an idler pulley 440, a redirect pulley 441, and a cord 442 (e.g., a rope, a chain, a cable, a string, or the like). The idler pulley 440 can be rotatably coupled to the arm 411 and the redirect pulley 441 can be rotatably coupled to the frame 406. One end of the cord 442 can be coupled to the frame 406 (or to the underside 404) at a first catch 443. The first catch 443 can be a hook, a clamp, a tie, or the like. The cord 442 can be routed around the idler pulley 440 and redirect pulley 441, and the other end of the cord 442 can be coupled to the wheel 431. The cord 442 can be configured to wrap around the wheel 431 as the work surface 402 translates towards the floor 429 and unwrap from the wheel 431 as the work surface 402 translates away from the floor 429.

The one or more leg assemblies 420 can be height adjustable (e.g., can be a telescopically adjusted, as illustrated in FIG. 4). The one or more leg assemblies 420 can be adapted to translate the frame 406 and the work surface 402 relative to the floor 429. A height adjustment mechanism 425 can be at least partially located inside the one or more leg assemblies 420. The height adjustment mechanism 425 can include a driving pulley 445. The driving pulley 445 can be rotatably coupled to the one or more leg assemblies 420 proximate to the work surface 402 (e.g., rotatably coupled to the third member 185 of the one or more leg assemblies 181 of the freestanding workstation 180 of FIG. 4). The driving pulley 445 can be operably coupled to the height adjustment mechanism 425 of the one or more leg assemblies 420 (e.g., the height adjustment mechanisms 503 and 524 of FIGS. 22-23). The driving pulley 445 can rotate relative to the one or more leg assemblies 420 around a driving pulley axis 446 as a height of the one or more leg assemblies 420 is adjusted. The driving pulley axis 446 can be substantially horizontal.

An aperture 447 (e.g., the aperture 515 shown in FIG. 22, or the aperture 536 shown in FIG. 23) can be formed on the driving pulley 445 proximate to its center. The aperture 447 can have a key shape (e.g., a square, a rectangle, a hexagon, a star, or the like) matching the key 435 formed on the synchronizing bar 430 proximate the first end 430A and the second end 430B. The aperture 447 can be adapted to receive the key 435. The driving pulley axis 446 can coincide with the bar axis 433. The driving pulley 445 can be configured to rotate the synchronizing bar 430 and drive (activate, move, or the like) the counterbalance mechanism 410 as the work surface translates relative to the floor 429.

Figure 18:
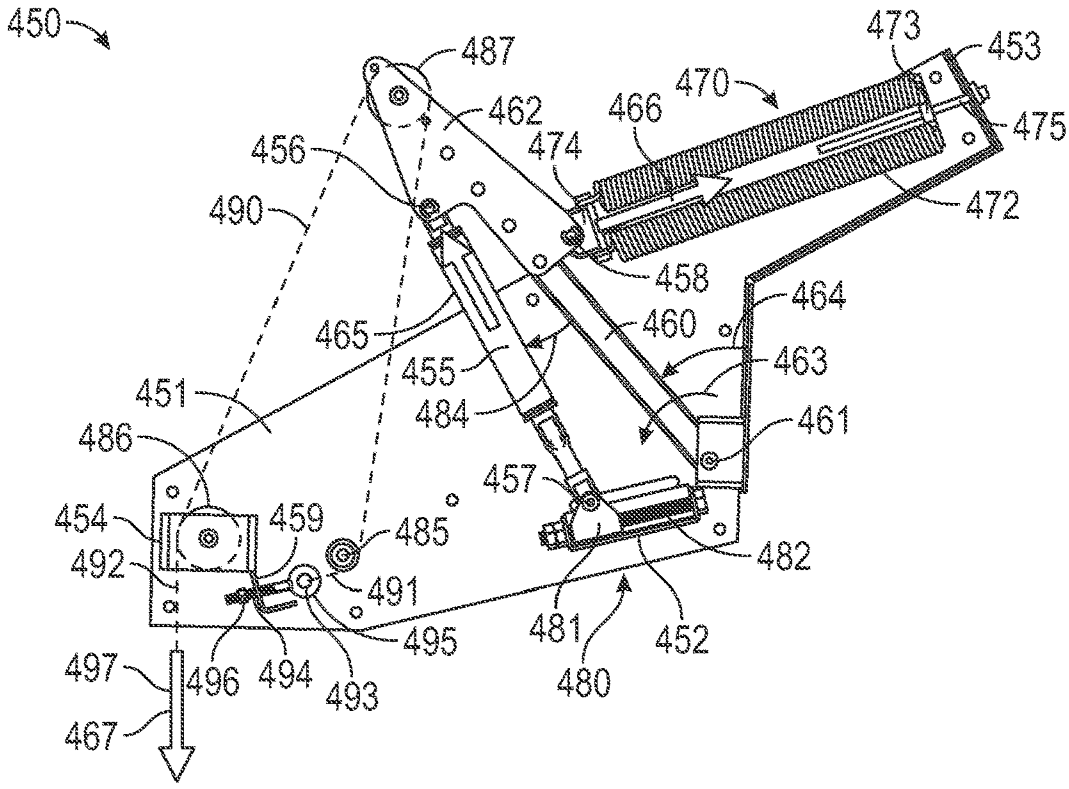
FIG. 18 is a schematic view of the counterbalance mechanism of FIG. 17 in a maximum adjustment setting.
Figure 19:
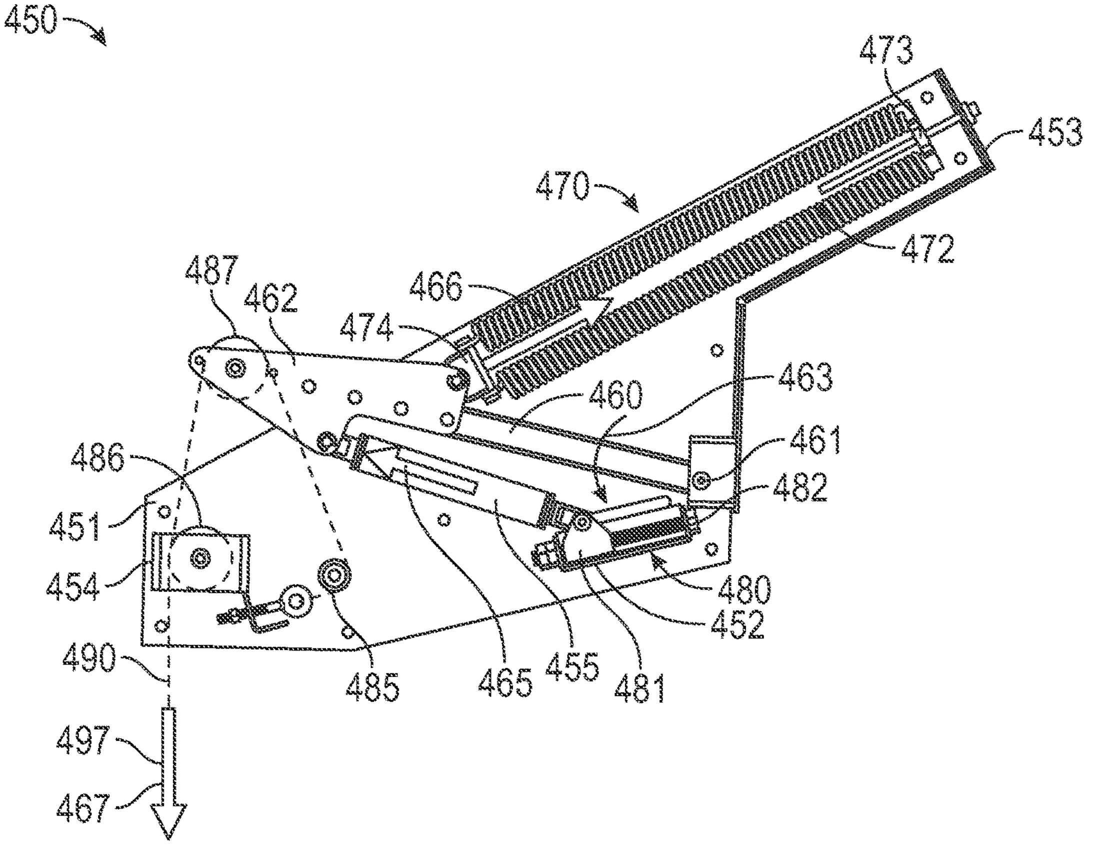
FIG. 19 is a schematic view of the counterbalance mechanism of FIG. 17 corresponding to a low position of the work surface.

FIGS. 18-19 are schematic views of a counterbalance mechanism 450 according to some example configurations of the current disclosure. The counterbalance mechanism 450 can include a main bracket 451. The main bracket 451 can be coupled to an underside of a work surface (e.g., coupled to the underside 188 of the work surface 175 of FIG. 4). In some example configurations, the main bracket 451 can include a first bracket 452, a second bracket 453, and a third bracket 454 to attach one or more components of the counterbalance mechanism 450 to the main bracket 451. The first bracket 452, the second bracket 453 and the third bracket 454 can be fixedly attached to the main bracket 451. In other example configurations, the first bracket 452, the second bracket 453 and the third bracket 454 can be formed (e.g., bent, stamped, extruded, or the like) out of the main bracket 451.

The counterbalance mechanism 450 can also include a gas spring 455, an arm 460, a booster assembly 470, and an adjustment mechanism 480. The arm 460 can be rotatably coupled to the main bracket 451 at a first hinge 461 located proximate one end of the arm 460, and an extension bracket 462 can be fixedly attached proximate the other end of the arm 460. The extension bracket 462 can facilitate coupling of one or more components of the counterbalance mechanism to the arm 460. In other example configurations, the arm 460 and the extension bracket 462 can be formed in a single component. In yet other example configurations, the extension bracket 462 can be eliminated, and one or more components of the counterbalance mechanism 450 can be directly coupled to the arm 460.

The counterbalance mechanism 450 can be operably coupled to the height adjustment mechanism 425 to provide lift assist during the height adjustment of one or more loads coupled to the lift mechanism (e.g., a work surface 175 coupled to the lift mechanism 100 of FIG. 4). The arm 460 can be adapted to rotate in a first direction 463 or in a second direction opposite the first direction 463 as the height of the load is adjusted (e.g., the arm 460 can rotate in the first direction 463 as the load is lowered and rotate in the second direction as the load is raised). The counterbalance mechanism 450 can counter at least a portion of the weight of the load coupled to the lift mechanism.

The adjustment mechanism 480 can be coupled to the main bracket 451 proximate the first hinge 461. The adjustment mechanism 480 can include a glider 481 and a first screw 482. The glider 481 can be slidably engaged with the first bracket 452. The first screw 482 can be coupled to the first bracket 452 and threadedly engaged with the glider 481.

The glider 481 is configured to translate relative to the first bracket 452 as the first screw 482 is rotated.

The gas spring 455 can be coupled to the extension bracket 462 at a second hinge 456 on one end and coupled to the glider 481 at a third hinge 457 on the other end. The gas spring 455 can be configured to bias the arm 460 to rotate in a second direction opposite the first direction 463.

The glider 481 can translate relative to the first bracket 452 to change a spring angle 484 between the gas spring 455 and the arm 460. The glider 481 can translate between a minimum adjustment configuration (e.g., the glider 481 is proximate the first hinge 461) and a maximum adjustment configuration (e.g., the glider is furthest away from the first hinge 461, as illustrated in FIG. 18) to adjust a lift force 203 generated by the counterbalance mechanism 410, as illustrated in FIG. 16.

The booster assembly 470 can be operably coupled to the main bracket 451 on one end and operably coupled to the extension bracket 462 at a fourth hinge 458 on the other end. The booster assembly 470 can include one or more springs 472 (e.g., one or more extension springs). The one or more springs 472 can be coupled to a first spring plate 473 on one end and coupled to a second spring plate 474 on the other end. The first spring plate 473 can be coupled to the second bracket 453 via a second screw 475. The second screw 475 can be rotating coupled to the second bracket 453 and threadedly engaged with the first spring plate 473. The second screw 475 can be adapted to adjust a tension of the one or more springs 472. The first spring plate 473 can move towards or away from the second bracket 453 to increase or decrease the tension on the one or more springs 472, respectively, as the second screw 475 is rotated relative to the second bracket 453. The one or more springs 472 can be configured to bias the arm 460 to rotate in a second direction opposite the first direction 463.

The counterbalance mechanism 450 can also include one or more redirect pulleys (e.g., a first redirect pulleys 485, and a second redirect pulley 486) and an idler pulley 487. The first redirect pulleys 485, and the second redirect pulley 486 can be rotatably coupled to the main bracket 451, and the idler pulley 487 can be rotatably coupled to the extension bracket 462. In some example configurations, the one or more redirect pulleys can be coupled to the main bracket 451 indirectly (e.g., the second redirect pulley 486 can be coupled to the third bracket 454, as illustrated in FIG. 18).

The counterbalance mechanism 450 can be operably coupled to the height adjustment mechanism 425 via a cord 490. The cord 490 can be an elongated member extending between a first portion 491 and a second portion 492. The first portion 491 of the cord 490 can be operably coupled to the main bracket 451 and the second portion 492 of the cord 490 can be operably coupled to the height adjustment mechanism 425 (e.g., coupled to the wheel 431 of FIG. 17). The cord 490 can be routed around the first redirect pulley 485, the idler pulley 487, and the second redirect pulley 486 between the first portion 491 and the second portion 492. The cord 490 can be made of an engineering material including, but not limited to, a steel cable, a tensile polymer rope, a chain, string, or the like.

The first portion of the cord 490 can be coupled to the main bracket 451 via an eye bolt 493. In some example configurations, the eye bolt 493 can be coupled to the third bracket 454, as illustrated in FIG. 18. The eye bolt 493 can have a threaded shaft 494 and a loop 495. The threaded shaft 494 can extend from the loop 495 in a transverse direction. The first portion 491 of the cord 490 can be coupled to the loop 495. The threaded shaft 494 can be inserted through an aperture 459 located on the third bracket 454, and a nut 496 can be threadedly engaged with the threaded shaft 494. A portion of the third bracket 454 can be at least partially located between the loop 495 and the nut 496. The nut 496 can be positioned on the threaded shaft 494 of the eye bolt 493 such that the loop 495 can be placed at a desired distance from the third bracket 454 to take a slack on the cord 490 that can be created when the cord 490 is operably coupled between the main bracket 451 and the height adjustment mechanism (e.g., the height adjustment mechanism 425 of FIG. 17).

During the height adjustment of the work surface 402, the synchronizing bar 430 coupled to the driving pulley 445 can rotate causing the wheel 431 to rotate. The rotation of the wheel 431 can be arranged such that the second portion 492 of the cord 490 can wrap around the wheel 431 as the work surface 402 is lowered. Therefore, the height adjustment mechanism 425 can pull the second portion 492 of the cord 490 in a second direction 497 during the translation of the work surface 402 towards the floor 429. The arm 460 can rotate in the first direction 463 to enable lowering of the work surface 402, as illustrated in FIG. 19.

Figure 24:
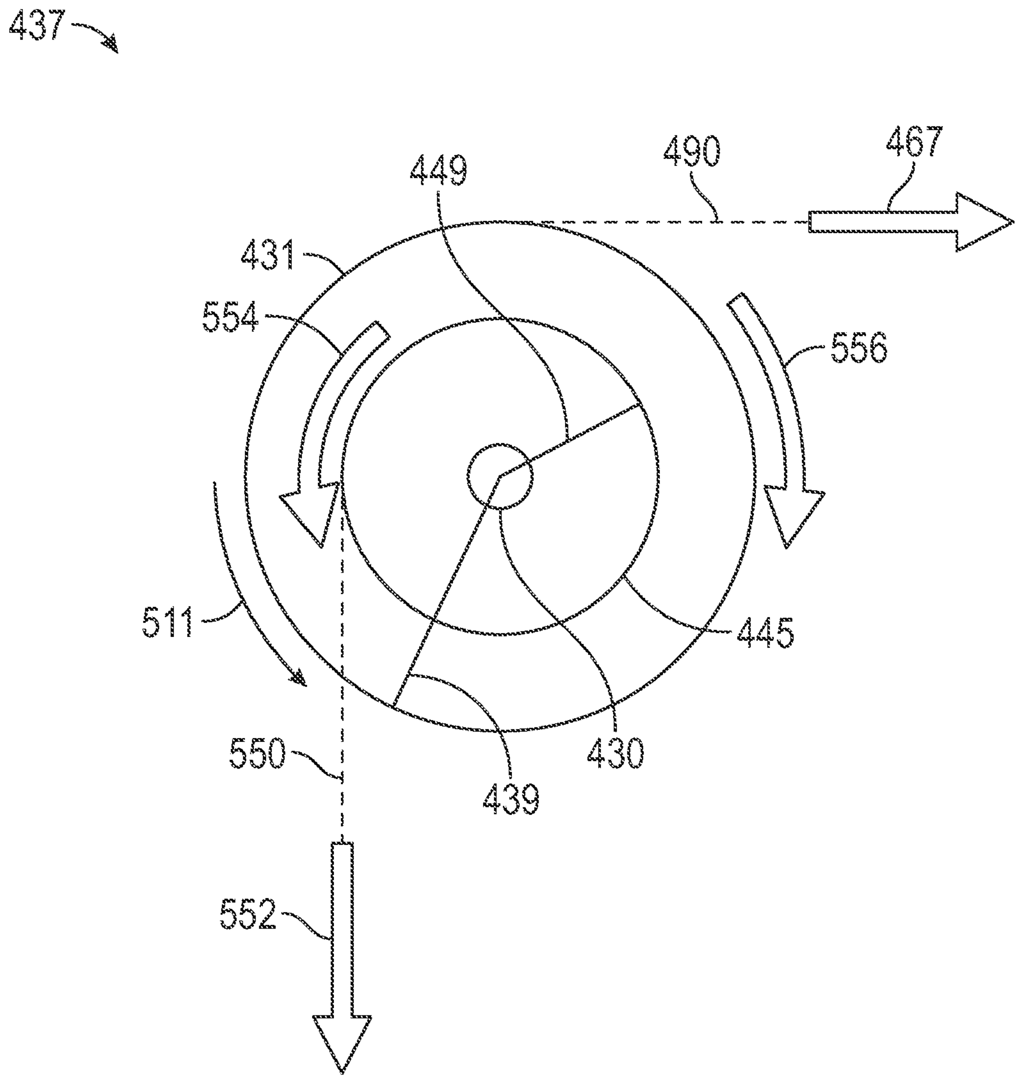
FIG. 24 is a schematic view of a driving pulley assembly.

The gas spring 455 can be compressed between the second hinge 456 and the third hinge 457 to create first force 465 (e.g., similar to the first force 321 of FIG. 13), and the one or more springs 472 can be adapted to be stretched between the first spring plate 473 and the second spring plate 474 to create a second force 466 (e.g., similar to the second force 322 of FIG. 13). The first force 465 can apply to the second hinge 456, and the second force 466 can apply to the fourth hinge 458, as illustrated in FIGS. 18-19. From the balance of the arm 460, the first force 465 and the second force 466 can define a cord force 467 (e.g., the second cord force 256 of FIG. 13 as discussed in previous sections). The cord force 467 can apply to the wheel 431, as illustrated in FIG. 24.

Figure 21:
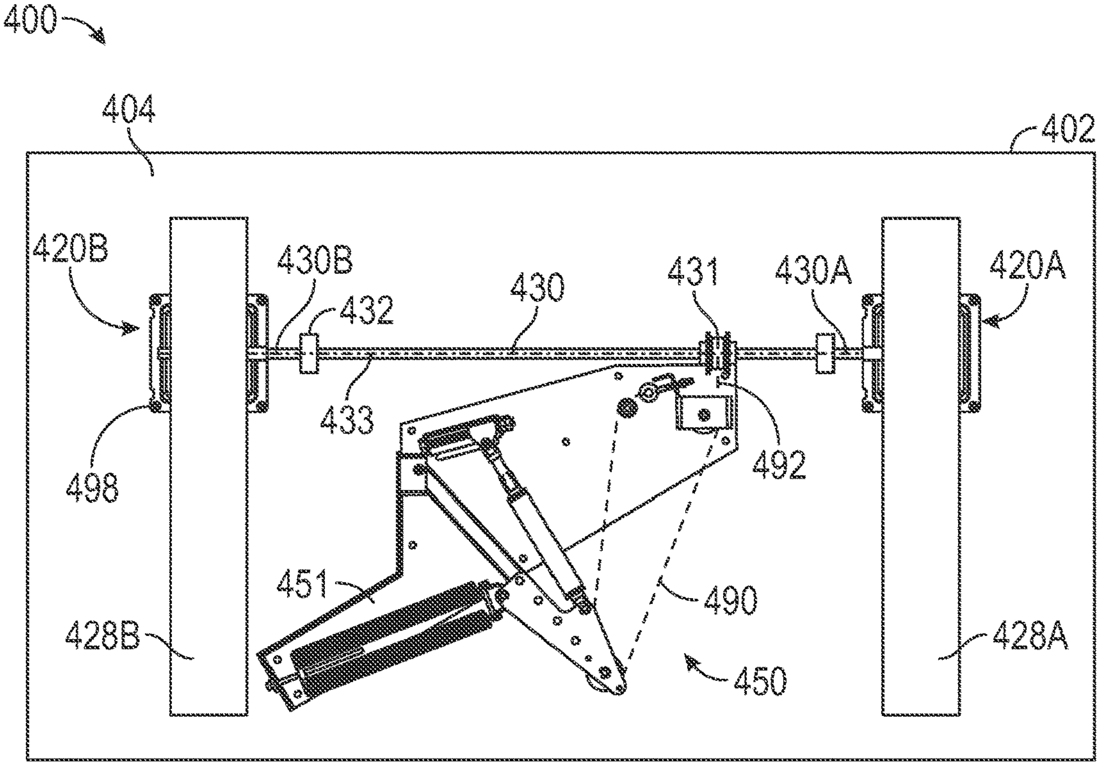
FIG. 21 is a bottom view of the freestanding workstation.

FIGS. 20-21 are front view and bottom view of a freestanding workstation 400 according to an example configuration of the current disclosure. The freestanding workstation 400 can include a lift mechanism 401 including one or more leg assemblies 420, a height adjustment mechanism 425 (e.g., the height adjustment mechanism 524 of FIG. 23), and a counterbalance mechanism 450 (e.g., the counterbalance mechanism 450 of FIG. 18).

The main bracket 451 of the counterbalance mechanism 450 of FIG. 18 can be coupled to an underside 404 of the work surface 402. One or more bushings 432 can be coupled to the underside 404. The one or more bushings 432 can hold a synchronizing bar 430 at a distance from the underside 404. A wheel 431 can be coupled to the synchronizing bar 430. The wheel 431 and the synchronizing bar 430 can be configured to rotate in unison around the bar axis 433 relative to the work surface 402. The counterbalance mechanism 450 can be operably coupled to the wheel 431 via a cord 490. The wheel 431 can be positioned on the synchronizing bar 430 such that the second portion 492 of the cord 490 can be in line with the wheel 431.

One or more leg assemblies 420 (e.g., the first leg assembly 420A and the second leg assembly 420B) can be coupled to the underside 404. In some example configurations, the one or more leg assemblies 420 can be directly coupled to the underside 404 using one or more fasteners 498 on one end, and coupled to one or more feet 428 (e.g., a first feet 428A, and a second feet 428B) on the other end. The one or more leg assemblies 420 can include a height adjustment mechanism 425. The height adjustment mechanism 425 can be at least partially contained inside the one or more leg assemblies 420. The height adjustment mechanism 425 contained inside the first leg assembly 420A and the second leg assembly 420B can be synchronized vie the synchronizing bar 430. The height adjustment mechanism 425 can be configured to provide height adjustment for the work surface 402 relative to the one or more feet 428. The height adjustment mechanism 425 can be coupled to the counterbalance mechanism 450 to counter the weight of the components coupled to the lift mechanism 401.

The synchronizing bar 430 can be elongated between a first end 430A and a second end 430B. The first end 430A can be located proximate the first leg assembly 420A and the second end 430B can be located proximate the second leg assembly 420B. The synchronizing bar 430 can be adapted to be coupled to the first leg assembly 420A at the first end 430A and coupled to the second leg assembly 420B at the second end 430B of the synchronizing bar 430. A key 435 (e.g., a key shaped as a square, a rectangle, a hexagon, a star, or the like) can be formed on the synchronizing bar 430 proximate the first end 430A and the second end 430B. The key 435 located on the synchronizing bar 430 can engage with the height adjustment mechanisms 425 located inside the one or more leg assemblies 420.

FIG. 22 is a schematic view of a leg assembly 500 according to an example configuration of the current disclosure. The leg assembly 500 can include a first member 501 and a second member 502 slidably engaged with the first member 501. The first member 501 can be elongated between a first portion 501A and a second portion 501B. The second member 502 can be elongated between a first portion 502A and a second portion 502B. In some example configurations, the first member 501 can be at least partially located inside the second member 502 (e.g., the second portion 501B of first member 501 can be located inside the first portion 502A of the second member 502). In other example configurations, the second member 502 can be at least partially located inside the first member 501.

The first member 501 can be coupled to a work surface proximate the first portion 501A (e.g., coupled to the work surface 402 of FIG. 20), and the second member 502 can be coupled to a foot (e.g., coupled to the one or more feet 428 of FIG. 20) proximate the second portion 502B. The first member 501 can be configured to translate relative to the second member 502 to adjust a distance between the first portion 502A of the first member 501 and the second portion 502B of the second member 502, and thus, the leg assembly 500 can provide height adjustment for the work surface 402 relative to the feet 428. One or more sliders (e.g., ball slides, friction slides, glides, rollers, or the like) can be located between the first member 501 and the second member 502. The one or more sliders can guide the first member 501 as it translates relative to the second member 502.

The leg assembly 500 can include a height adjustment mechanism 503 having a driver assembly 504 and a pole 505. The driver assembly 504 can be at least partially located inside the first member 501. The driver assembly 504 can be configured to rotate the synchronizing bar 430, and as a result, the driver assembly 504 can be configured to drive the counterbalance mechanism 450 as discussed in previous sections.

In some example configurations, the driver assembly 504 can include a first sprocket 506 and a second sprocket 507. The first sprocket 506 can be rotatably coupled to the first member 501 proximate to the portion 501A, and the second sprocket 507 can be rotatably coupled to the first member 501 proximate to the second portion 501B. A tensile member 508 (e.g., a chain, a rope, a cable, a string, or the like) can be coupled to the first sprocket 506 and the second sprocket 507. The tensile member 508 can make a loop around the first sprocket 506 and the second sprocket 507, and the tensile member 508 can at least partially wrap around the first sprocket 506 and the second sprocket 507, as illustrated in FIG. 22. The tensile member 508 can be keyed (e.g., coupled, connected, attached, or the like) to the first sprocket 506 and the second sprocket 507 such that the tensile member 508 can synchronize the rotation of the first sprocket 506 and the second sprocket 507.

The pole 505 can be at least partially located inside the second member 502. The pole 505 can be elongated between a first end 505A and a second end 505B. The first end 505A of the pole 505 can be coupled to the second member 502 proximate the second portion 502B, and the second end 505B of the pole 505 can be located inside the first member 501. The tensile member 508 can be fixedly attached to the pole 505 at a clasp 509 proximate the second end 505B of the pole 505. The clasp 509 can be located inside the first member 501 between the first sprocket 506 and the second sprocket 507. The clasp 509 can be fixedly attached to the pole 505, and the clasp 509 can translate relative to the first member 501 as the first member 501 translates relative to the second member 502. Since the tensile member 508 is keyed to the first sprocket 506 and the second sprocket 507, the first sprocket 506 and the second sprocket 507 can be configured to rotate relative to the first member 501 in a first direction 511 and a section of the tensile member 508 can translate in a second direction 512 as the first member 501 translates relative to the second member 502 (e.g., as the first member 501 moves towards the second portion 502B of the second member 502), as illustrated in FIG. 22.

The first sprocket can have an aperture 515 formed proximate to its center. The aperture 515 can have a shape (e.g., a square, a rectangle, a hexagon, a star, or the like) to match the key 435 formed on the synchronizing bar 430 (e.g., the key 435 formed on the first end 430A and the second end 430B of the synchronizing bar 430). The aperture 515 can be adapted to receive the key 435. The synchronizing bar 430 can be configured to rotate together with the first sprocket 506 as the first member 501 translates relative to the second member 502.

FIG. 23 is a schematic view of a leg assembly 520 according to another example configuration of the current disclosure. The leg assembly 520 can include a first member 521, a second member 522, and a third member 523. The first member 521 can be slidably engaged with the second member 522, and the second member 522 can be slidably engaged with the third member 523. The first member 521 can be elongated between a first portion 521A and a second portion 521B. The second member 522 can be elongated between a first portion 522A and a second portion 522B. The third member 523 can be elongated between a first portion 523A and a second portion 523B. In some example configurations, the first member 521 can be at least partially located inside the second member 522 (e.g., the second portion 521B of the first member 521 can be located inside the second member 522 proximate the first portion 522A of the second member 522), and the second member 522 can be at least partially located inside the third member 523 (e.g., the second portion 522B of the second member 522 can be located inside the third member 523 proximate the first portion 523A of the third member 523). In other example configurations, the second member 522 can be at least partially located inside the first member 521, and the third member 523 can be at least partially located inside the second member 522.

The first member 521 can be coupled to a work surface proximate the first portion 521A (e.g., coupled to the work surface 402 of FIG. 20), and the third member 523 can be coupled to a foot (e.g., coupled to the one or more feet 428 of FIG. 20) proximate the second portion 523B. The first member 521 can be configured to translate relative to the second member 522 and the third member 523 to provide height adjustment for the work surface 402. A first set of one or more sliders (e.g., ball slides, friction slides, glides, rollers, or the like) can be located between the first member 521 and the second member 522 to guide the first member 521 as it translates relative to the second member 522. A second set of one or more sliders can be located between the second member 522 and the third member 523 to guide the second member 522 as it translates relative to the third member 523.

In some example configurations, the leg assembly 520 can include a height adjustment mechanism 524 having a driver assembly 525 located at least partially inside the first member 521, and a synchronizer assembly 526 located at least partially inside the second member 522. The synchronizer assembly 526 can synchronize the displacement of the first member 521 relative to the second member 522 with the displacement of the second member 522 relative to the third member 523. The driver assembly 525 can be operably coupled to the counterbalance mechanism 450 of FIG. 21 to drive the counterbalance mechanism 450 as a height of the leg assembly 520 is adjusted.

In some example configurations, the driver assembly 525 can include a first sprocket 531 and a second sprocket 532. The first sprocket 531 can be rotatably coupled to the first member 521 proximate to the first portion 521A, and the second sprocket 532 can be rotatably coupled to the first member 521 proximate to the second portion 521B. A first tensile member 533 (e.g., a chain, a rope, a cable, a string, or the like) can be coupled to the first sprocket 531 and the second sprocket 532. The first tensile member 533 can make a loop around the first sprocket 531 and the second sprocket 532, and the first tensile member 533 can at least partially wrap around the first sprocket 531 and the second sprocket 532, as illustrated in FIG. 23. The first tensile member 533 can be keyed (e.g., coupled, connected, attached, or the like) to the first sprocket 531 and the second sprocket 532 such that the first tensile member 533 can synchronize the rotation of the first sprocket 531 and the second sprocket 532.

A first pole 534 can be coupled to the second member 522. The first pole 534 can be at least partially located inside the second member 522. The first pole 534 can be elongated between a first end 534A and a second end 534B. The first end 534A of the first pole 534 can be coupled to the second member 522 proximate the second portion 522B, and the second end 534B of the first pole 534 can be located inside the first member 521. The first tensile member 533 can be fixedly attached to the first pole 534 at a first clasp 535 proximate the second end 534B of the first pole 534. The first clasp 535 can be located inside the first member 521 between the first sprocket 531 and the second sprocket 532. The first clasp 535 can be fixedly attached to the first pole 534, and the first clasp 535 can translate relative to the first member 521 as the first member 521 translates relative to the second member 522. Since the first tensile member 533 is keyed to the first sprocket 531 and the second sprocket 532, the first sprocket 531 and the second sprocket 532 can be configured to rotate relative to the first member 521 as the first member 521 translates relative to the second member 522. For example, the first sprocket 531 can be configured to rotate in a first direction 511 while a section of the first tensile member 533 can be configured to translate in a second direction 512 as the first member 521 translates towards the second portion 523B of the third member 523, as illustrated in FIG. 23.

The first sprocket 531 can have an aperture 536 formed proximate to its center. The aperture 536 can have a shape (e.g., a square, a rectangle, a hexagon, a star, or the like) to match the key 435 formed on the synchronizing bar 430 (e.g., the key 435 formed on the first end 430A and the second end 430B of the synchronizing bar 430). The aperture 536 can be adapted to receive the key 435. The synchronizing bar 430 can be configured to rotate together with the first sprocket 531 as the first member 521 translates relative to the second member 522.

The synchronizer assembly 526 can include a third sprocket 541, a fourth sprocket 542, and a second pole 543. The second pole 543 can be elongated between a first end 543A and a second end 543B. The first end 543A of the second pole 543 can be coupled to the second member 522 (e.g., coupled to the second portion 522B of the second member 522), and the second end 543B of the second pole 543 can be located inside the first member 521, as illustrated in FIG. 23. The third sprocket 541 and the fourth sprocket 542 can be rotatably coupled to the second pole 543 proximate the second end 543B and the first end 543A of the second pole 543, respectively. Therefore, the third sprocket 541 can be rotatably coupled to the second member 522 proximate the first portion 522A of the second member 522, and the fourth sprocket 542 can be coupled to the second member 522 proximate the second portion 522B of the second member 522, as illustrated in FIG. 23.

A second tensile member 545 (e.g., a chain, a rope, a cable, a string, or the like) can be coupled to the third sprocket 541 and the fourth sprocket 542. The second tensile member 545 can make a loop around the third sprocket 541 and the fourth sprocket 542, and the second tensile member 545 can at least partially wrap around the third sprocket 541 and the fourth sprocket 542, as illustrated in FIG. 23. The second tensile member 545 can be keyed (e.g., coupled, connected, attached, or the like) to the third sprocket 541 and the fourth sprocket 542 such that the second tensile member 545 can synchronize the rotation of the third sprocket 541 and the fourth sprocket 542.

A third pole 547 can be coupled to the third member 523. The third pole 547 can be at least partially located inside the third member 523. The third pole 547 can be elongated between a first end 547A and a second end 547B. The first end 547A of the third pole 547 can be coupled to the third member 523 proximate the second portion 523B, and the second end 547B of the third pole 547 can be located inside the second member 522.

The second tensile member 545 can be fixedly attached to the first member 521 proximate the second portion 521B of the first member 521 at a second clasp 548, and the second tensile member 545 can be fixedly attached to the third pole 547 proximate the second end 547B of the third pole 547 at a third clasp 549. The second clasp 548 and the third clasp 549 can be located between the third sprocket 541 and the fourth sprocket 542. The second clasp 548 and the third clasp 549 can translate relative to the second member 522 as the first member 521 translates relative to the second member 522 and the second member 522 translates relative to the third member 523. Since the second tensile member 545 is keyed to the third sprocket 541 and the fourth sprocket 542, the third sprocket 541 and the fourth sprocket 542 can be configured to rotate for an equal amount relative to the second member 522 to equalize the movement of the first member 521 relative to the second member 522 and the movement of the second member 522 relative to the third member 523.

In some example configurations, the first sprocket 506 of the leg assembly 500 of FIG. 22, or the first sprocket 531 of the leg assembly 520 of FIG. 23 can be equivalent to the driving pulley 445 of the lift mechanism 401 of FIG. 17. In other configurations, a separate driving pulley can be coupled to the height adjustment mechanism (e.g., coupled to the first sprocket 506 of FIG. 22, or coupled to the first sprocket 531 of FIG. 22). The driving pulley 445 can be operably coupled to the counterbalance mechanism 410 through a driving pulley assembly 437 (shown in FIG. 17). The driving pulley 445 can drive the counterbalance mechanism 410 during the height adjustment of the one or more leg assemblies 420 to create a lift force acting on the movable portion to counter a weight of the one or more loads coupled to the movable portion.

FIG. 24 is a schematic view of the driving pulley assembly 437 of FIG. 17 according to an example configuration of the current disclosure. The driving pulley assembly can include a driving pulley 445 having a first radius 449, a synchronizing bar 430, and a wheel 431 having a second radius 439. The driving pulley 445, the synchronizing bar 430, and the wheel 431 can be concentric about the bar axis 433. The synchronizing bar 430 can be coupled to the driving pulley 445 as discussed in previous sections, and the wheel 431 can be coupled to the synchronizing bar 430 as illustrated in FIG. 17. The driving pulley assembly 437 can rotate about the bar axis 433 to enable the lift mechanism 401 to raise and love the movable portion and one or more loads coupled to the movable portion (e.g., the work surface 402 of FIG. 17).

A tensile member 550 (e.g., the tensile member 508 of FIG. 22, or the first tensile member 533 of FIG. 23) can be coupled to the driving pulley 445. The tensile member 550 can be adapted to carry at least a portion of a combined weight 552 of the movable portion (e.g., the movable portion 120 of the freestanding workstation 180 of FIG. 4, or the like) and the weight of the one or more loads coupled to the movable portion (e.g., the one or more loads 130 of FIG. 4, or the like). The tensile member 550 can be adapted to rotate the driving pulley assembly 437 in a first direction 511, and the combined weight 552 acting on the driving pulley 445 via the tensile member 550 can apply a first torque 554 to the driving pulley assembly 437 in the first direction 511, as illustrated in FIG. 24.

The cord force 467 created by the counterbalance mechanism 450 and acting on the wheel 431 via the cord 490 (shown in FIGS. 18-19) can apply a second torque 556 to the driving pulley assembly 437 in a direction opposite the first direction 511. The first torque 554 can be equal to the second torque 556 to keep the driving pulley assembly 437 in a balanced state. To maintain the driving pulley assembly 437 in a balanced state (e.g., the combined weight 552 can be countered by the cord force 467 generated by the counterbalance mechanism 450), the cord force 467 can be equal to the combined weight 552 multiplied by the ratio of the first radius 449 to the second radius 439.

The cord force 467 can be defined by one or more parameters of the gas spring 455, one or more parameters of the one or more springs 472, and a geometry of the counterbalance mechanism 450. By selecting the parameters and the geometry, the cord force 467 can be created to maintain the driving pulley assembly in the balanced state. Although the first force 465 and the second force 466, shown in FIGS. 18-19, can vary during the translation of the movable portion, because of the varying spring angle 484 and the arm angle 464, the cord force 467 can be substantially constant.

If the driving pulley assembly 437 is in the balanced state, the driving pulley assembly 437 can be stationary (e.g., the driving pulley assembly 437 cannot rotate about the bar axis 433) maintaining the position (e.g., a height) of the movable portion and one or more loads coupled to the movable portion (e.g., the work surface 402). In the balanced state of the driving pulley assembly 437, a user of the positioning apparatus 10 (e.g., the freestanding workstation 400 of FIG. 20) can adjust a height of the movable portion by applying a small amount of force to the movable portion.

In some example configurations, a lock mechanism can be coupled between the movable portion 120 and the fixed portion 110 to maintain the position of the movable portion 120 relative to the structure 140. In some example configurations, the lock assembly can be coupled between the work surface 402 or the frame 406 and the driving pulley assembly 437.

Additional Notes and Aspects

Example 1 is a lift system for raising and lowering a load, the lift system comprising: a fixed portion couplable to a structure; a movable portion couplable to the load, the movable portion translatable relative to the fixed portion; one or more sliding mechanisms coupled between the fixed portion and the movable portion, the one or more sliding mechanisms at least partially defining a range of travel of the movable portion relative to the fixed portion; and a counterbalance mechanism coupled to the fixed portion and the movable portion, the counterbalance mechanism operable to generate a lift force for countering a weight of the load.

In Example 2, the subject matter of Example 1 optionally includes the counterbalance mechanism comprising: an arm rotatably coupled to the fixed portion; an adjustment mechanism coupled to the fixed portion; an energy storage member coupled between the arm and the adjustment mechanism, the energy storage member configured to bias the arm to rotate in a first direction; and a cord coupled to the arm and the movable portion.

In Example 3, the subject matter of Example 2 optionally includes wherein the energy storage member includes one or more of a gas spring, a compression spring, and an extension spring.

In Example 4, the subject matter of any one or more of Examples 2-3 optionally include an idler pulley coupled to the arm; and one or more redirect pulleys coupled to the fixed portion; wherein the cord is coupled to the fixed portion at a first end and coupled to the movable portion at a second end, wherein the cord is routed around the idler pulley and one or more redirect pulleys between the first end and the second end, and wherein the cord is configured to rotate the arm in a second direction opposite the first direction when the movable portion translates from a high position towards a low position.

In Example 5, the subject matter of any one or more of Examples 2-4 optionally include the adjustment mechanism comprising: a bracket coupled to the fixed portion; a glider movably coupled to the bracket and rotatably coupled to the energy storage member; and a screw rotatably coupled to the bracket and threadedly engaged with the glider, the screw is adapted to translate the glider relative to the bracket when it is rotated; wherein the adjustment mechanism is configured to change an angle between the energy storage member and the arm when the glider translates relative to the bracket.

Example 6 is a lift system for raising and lowering a work surface, comprising: a work surface having an underside; a counterbalance mechanism coupled to the underside; and one or more leg assemblies removably coupled to the underside and operably coupled to the counterbalance mechanism; wherein the one or more leg assemblies are configured to translate the work surface between a high position and a low position, wherein the one or more leg assemblies are configured to activate the counterbalance mechanism when the work surface is translated, and wherein the counterbalance mechanism is adapted to provide lift assist by countering a weight of the work surface as the work surface translates between the high position and the low position.

In Example 7, the subject matter of Example 6 optionally includes a frame coupled to the underside; wherein the one or more leg assemblies are removably coupled to the frame, wherein the counterbalance mechanism is coupled to the frame.

In Example 8, the subject matter of any one or more of Examples 6-7 optionally include the one or more leg assemblies comprising: a first member coupled to the underside; a second member slidably engaged with the first member on a first end and coupled to a foot on a second end, the second end opposite the first end; wherein the foot is adapted to be placed over a structure, and wherein the first member is configured to translate relative to the second member to provide height adjustment for the work surface.

In Example 9, the subject matter of any one or more of Examples 6-8 optionally include the one or more leg assemblies comprising: a first member coupled to the underside; a second member slidably engaged with the first member; and a third member slidably engaged with the second member on a first end and coupled to a foot on a second end, the second end opposite the first end; wherein the foot is adapted to be placed over a structure, and wherein the first member and the second member are configured to translate relative to the third member to provide height adjustment for the work surface.

In Example 10, the subject matter of any one or more of Examples 8-9 optionally include a driving pulley assembly, the driving pulley assembly includes: one or more bushings coupled to the underside; a bar elongated between a first bar end and a second bar end, the bar is coupled to the one or more leg assemblies at the first bar end and the second bar end and rotatably coupled to the one or more bushings between the first bar end and the second bar end; and a wheel coupled to the bar between the first bar end and the second bar end; wherein the driving pulley assembly is removably coupled to the one or more leg assemblies and operably coupled to the counterbalance mechanism, wherein a translation of the work surface is adapted to rotate the bar relative to the work surface, and wherein a rotation of the bar is configured to activate the counterbalance mechanism.

In Example 11, the subject matter of Example 10 optionally includes the bar includes a key formed on the first bar end and the second bar end, wherein the key is formed in a shape selected from a group including a star, an oval, a square, a rectangle, a hexagon, a triangle and a polygon.

In Example 12, the subject matter of any one or more of Examples 10-11 optionally include the counterbalance mechanism comprising: an arm rotatably coupled to the underside; a first adjustment mechanism coupled to the underside; and a first energy storage member coupled between the arm and the first adjustment mechanism, the first energy storage member is configured to bias the arm to rotate in a first direction; wherein the first adjustment mechanism is configured to change an aspect of the first energy storage member.

In Example 13, the subject matter of Example 12 optionally includes the first adjustment mechanism comprising: a bracket coupled to the underside; a glider movably coupled to the bracket; and a screw rotatably coupled to the bracket and threadedly engaged with the glider; wherein the first energy storage member is rotatably coupled to the glider, wherein the screw is adapted to translate the glider relative to the bracket when it is rotated, and wherein the first adjustment mechanism is configured to change an angle between the first energy storage member and the arm when the glider translates relative to the bracket.

In Example 14, the subject matter of Example 13 optionally includes an idler pulley coupled to the arm; one or more redirect pulleys coupled to the underside; and a cord having a first end and a second end; wherein the cord is coupled to the underside at the first end and coupled to the wheel at the second end, wherein the cord is routed around the idler pulley and one or more redirect pulleys between the first end and the second end, and wherein the cord is configured to rotate the arm in a second direction opposite the first direction when the work surface translates from the high position towards the low position.

In Example 15, the subject matter of any one or more of Examples 11-14 optionally include the one or more leg assemblies comprises a driver assembly; the driver assembly including: a first sprocket rotatably coupled to the first member proximate the underside, the first sprocket having an aperture formed in a shape matching a shape of the key formed on the first bar end and the second bar end; a second sprocket rotatably coupled to the first member away from the first sprocket proximate the second member; a first tensile member coupled to the first sprocket and the second sprocket, the first tensile member forms a loop around the first sprocket and the second sprocket, and the first tensile member is keyed to the first sprocket and the second sprocket to synchronize the rotation of the first sprocket with the rotation of the second sprocket; and a first pole coupled to the second member on one end and coupled to the first tensile member on the other end; wherein the driver assembly is at least partially contained inside the first member, and a portion of the driver assembly is configured to translate with the first member, wherein the first sprocket and the second sprocket are configured to rotate in response to a height adjustment of one or more leg assemblies, and wherein the aperture is adapted to receive the key located on the first bar end or the second bar end, and wherein the first sprocket is adapted to rotate the bar in response to a height adjustment of the one or more leg assemblies.

In Example 16, the subject matter of any one or more of Examples 9-15 optionally include the one or more leg assemblies further comprising a synchronizer assembly; the synchronizer assembly includes: a second pole extending from a first end to a second end, the first end of the second pole is coupled to the second member and the second end of the second pole is located inside the first member; a third pole extending from a first end to a second end, the first end of the third pole is coupled to the third member and the second end of the third pole is located inside the second member; a third sprocket rotating coupled to the second pole proximate the second end of the second pole, a fourth sprocket rotating coupled to the second pole proximate the first end of the second pole; and a second tensile member coupled to the third sprocket and the fourth sprocket, the second tensile member forms a loop around the third sprocket and the fourth sprocket, the second tensile member is keyed to the third sprocket and the fourth sprocket to synchronize the rotation of the third sprocket with the rotation of the fourth sprocket, the second tensile member is also coupled to the third pole proximate the second end of the third pole and coupled to the first member; wherein the synchronizer assembly is at least partially contained inside the second member, and a portion of the synchronizer assembly is configured to translate with the second member, and wherein the synchronizer assembly is configured to synchronize a movement between the first member and the second member with a movement between the second member and the third member.

In Example 17, the subject matter of any one or more of Examples 12-16 optionally include the counterbalance mechanism further includes a booster assembly coupled between the underside and the arm, wherein the booster assembly is configured to be selectively activated to bias the arm in the first direction.

In Example 18, the subject matter of Example 17 optionally includes the booster assembly comprises: a first spring plate rotatably coupled to the arm; a second spring plate having a threaded hole proximate to its center; a second energy storage member coupled between the first spring plate and the second spring plate; and a screw rotatably coupled to the underside and threadedly engaged with the second spring plate at the threaded hole; wherein the screw is adapted to translate the second spring plate along a screw axis to adjust a tension of the second energy storage member.

In Example 19, the subject matter of any one or more of Examples 17-18 optionally include the booster assembly comprises: a first tube having a first end and a second end coupled to a first ring, the first tube is rotatably coupled to the underside at the first ring; a second tube slidably engaged with the first tube, the second tube having a first end located inside the first tube and a second end; a rod slidably engaged with the first tube, the rod having a first end located inside the second tube and a second end; the rod includes: a first brace coupled to the first end of the rod; a second brace coupled proximate the second end of the rod; and a second ring couped to the second end of the rod, the rod is rotatably coupled to the arm at the second ring; a second energy storage member coupled between the first brace and the second end of the second tube, the second energy storage member is compressed between the first brace and the second end of the second tube to bias the second tube towards the second brace; and a clasp selectively couplable between the first tube and the second tube, the booster assembly is activated when the clasp is engaged with both the first tube and the second tube and deactivated when the clasp is disengaged from one or both of the first tube and the second tube; wherein the booster assembly is configured to bias the arm to rotate in the first direction when the booster assembly is activated.

In Example 20, the subject matter of any one or more of Examples 6-19 optionally include a main bracket coupled to the underside, wherein the counterbalance mechanism is coupled to the main bracket.

Each of these non-limiting examples can stand on its own or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

What is claimed is:

1. A lift system for raising and lowering a load, the lift system comprising:

a fixed portion couplable to a structure;

a movable portion couplable to the load, the movable portion translatable relative to the fixed portion;

one or more sliding mechanisms coupled between the fixed portion and the movable portion, the one or more sliding mechanisms at least partially defining a range of travel of the movable portion relative to the fixed portion;

a counterbalance mechanism coupled to the fixed portion and the movable portion, the counterbalance mechanism operable to generate a lift force for countering a weight of the load, the counterbalance mechanism comprising:

an arm rotatably coupled to the fixed portion;

an adjustment mechanism coupled to the fixed portion;

an energy storage member coupled between the arm and the adjustment mechanism, the energy storage member configured to bias the arm to rotate in a first direction; and a cord coupled to the arm and the movable portion;

an idler pulley coupled to the arm; and one or more redirect pulleys coupled to the fixed portion;

wherein the cord is coupled to the fixed portion at a first end and coupled to the movable portion at a second end;

wherein the cord is routed around the idler pulley and one or more redirect pulleys between the first end and the second end; and wherein the cord is configured to rotate the arm in a second direction opposite the first direction when the movable portion translates from a high position towards a low position.

2. The lift system of claim 1, wherein the energy storage member includes one or more of a gas spring, a compression spring, and an extension spring.

3. The lift system of claim 1, the adjustment mechanism comprising:

a bracket coupled to the fixed portion;

a glider movably coupled to the bracket and rotatably coupled to the energy storage member; and a screw rotatably coupled to the bracket and threadedly engaged with the glider, the screw is adapted to translate the glider relative to the bracket when it is rotated;

wherein the adjustment mechanism is configured to change an angle between the energy storage member and the arm when the glider translates relative to the bracket.

* * * * *